US010515422B2

(12) United States Patent
Sriram et al.

(10) Patent No.: US 10,515,422 B2
(45) Date of Patent: Dec. 24, 2019

(54) NETWORK-BASED SYNCHRONIZATION SYSTEM AND METHOD

(71) Applicant: INTUIT INC., Mountain View, CA (US)

(72) Inventors: Varadarajan Sriram, Escondido, CA (US); Ashpak Salim Shaikh, San Diego, CA (US); Harsimran S. Badwal, San Diego, CA (US); Vitaliy Igorevich Lee, San Deigo, CA (US); Brian Joon Chung, San Diego, CA (US); Joshua David Ackerman, San Deigo, CA (US); Caitlin Elizabeth Flint, San Diego, CA (US); Michael Albert Miljour, San Diego, CA (US); Karla Julietta Uribe, Chula Vista, CA (US); Carol Ann Howe, San Diego, CA (US); Robert E. Bamford, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 1018 days.

(21) Appl. No.: 14/993,766

(22) Filed: Jan. 12, 2016

(65) Prior Publication Data

US 2017/0200235 A1 Jul. 13, 2017

(51) Int. Cl.

*G06Q 40/00* (2012.01)
*G06K 9/18* (2006.01)
*H04N 7/18* (2006.01)

(52) U.S. Cl.

CPC ............ *G06Q 40/123* (2013.12); *G06K 9/18* (2013.01); *H04N 7/185* (2013.01); *G06K 2209/01* (2013.01)

(58) Field of Classification Search

CPC .................................................. G06Q 40/123
See application file for complete search history.

(56) References Cited

U.S. PATENT DOCUMENTS 8,583,517 B1 * 11/2013 Ohme .................. G06Q 20/207 705/31
9,185,162 B2 11/2015 Zhang et al.
(Continued)

OTHER PUBLICATIONS

PCT International Search Report for PCT/US2017/012995, Applicant: Intuit Inc., Form PCT/ISA/210 and 220, dated May 11, 2017 (5pages).

(Continued)

*Primary Examiner* — Mike Anderson
(74) *Attorney, Agent, or Firm* — DLA Piper LLP US

(57) ABSTRACT

A network-based synchronization system includes a server executing an electronic tax preparation program. The server is in communication with first and second computing devices through first and second networks. The first computing device utilizes the electronic tax preparation program. The second computing device is a mobile communication device including an image acquisition component and a mobile application executing thereon. The server, and the first and second computing devices are cooperatively operable through the first and second networks to synchronize the electronic tax preparation program and the mobile application based at least in part upon data acquired by the image acquisition component. The server receives the data acquired by the image acquisition component and transmits the data to the first computing device to synchronize the mobile application and the electronic tax preparation program.

20 Claims, 39 Drawing Sheets

400
324 402 404 N 326 Y 406 N Y 408 410 412 332 414 N 432 Y Y 416 N 420 Y N 418 422 N 430 N Y Y 424 N Y 426 N Y 428 340

(56) References Cited

U.S. PATENT DOCUMENTS

| | | | | |
|---|---|---|---|---|
| 9,406,089 | B2 * | 8/2016 | Mori | G06Q 40/123 |
| 2004/0203668 | A1 | 10/2004 | Bowne et al. | |
| 2008/0120129 | A1 * | 5/2008 | Seubert | G06Q 10/06 705/35 |
| 2014/0244455 | A1 * | 8/2014 | Huang | G06T 7/00 705/31 |
| 2014/0258970 | A1 * | 9/2014 | Brown | G06F 8/47 717/103 |
| 2014/0324648 | A1 * | 10/2014 | Mori | G06Q 40/123 705/31 |
| 2015/0186538 | A1 * | 7/2015 | Yan | G06F 16/14 707/722 |
| 2015/0286860 | A1 | 10/2015 | Ruiz-Tapiador | |

OTHER PUBLICATIONS

PCT Written Opinion of the International Search Authority for PCT/US2017/012995, Applicant: Intuit Inc., Form PCT/ISA/237, dated May 11, 2017 (10pages).

* cited by examiner 104
100
114
106
118
116
TurboTax
108-1
108-2
WAN
WAN 102-1
102-2
110
112
WAN
108-3

140

NETWORK-BASED SYNCHRONIZATION SYSTEM AND METHOD

SUMMARY

Embodiments are directed to network-based synchronization systems. In particular, embodiments are directed to synchronized tax data acquisition systems including network-based synchronization systems.

In one embodiment directed to a network-based synchronization system, the system includes a server having a server processor and executing an electronic tax preparation program operable to prepare an electronic tax return. The server is in communication with a first computing device comprising a first processor through a first network and a second computing device comprising a second processor through a second network. The first computing device utilizes the electronic tax preparation program. The second computing device is a mobile communication device including an image acquisition component. The system also includes a mobile application executing on the second computing device and in communication with the server. The mobile application executed by the second computing device, the server and the first computing device are cooperatively operable through the first network and the second network to synchronize the electronic tax preparation program utilized by the first computing device and the mobile application executing on the second computing device. The synchronization is based at least in part upon data acquired by the image acquisition component of the second computing device. The server receives the data acquired by the image acquisition component from the second computing device through the second network. The server transmits the data received from the second computing device to the first computing device through the first network to synchronize the mobile application executing on the second computing device and the electronic tax preparation program utilized by the first computing device.

In another embodiment directed to a computer-implemented method of synchronizing an electronic tax preparation program utilized by a first computing device and a mobile application executing on a second computing device, the method includes receiving data acquired by the image acquisition component from the second computing device through a second network. The method also includes transmitting the data received from the second computing device to the first computing device through a first network. The method further includes synchronizing the mobile application and the electronic tax preparation program based at least in part on the transmitted data.

In one or more embodiments, the server hosts the mobile application. The server may transmit the mobile application to the second computing device. The first computing device may include a browser that is executable to communicate through the first network with the server. The first computing device may utilize the electronic tax preparation program through the browser and the first network.

In one or more embodiments, synchronizing the mobile application and the electronic tax preparation program includes adjusting a state of the electronic tax preparation program in response to a change in a state of the mobile application. The state of the mobile application may relate to data acquired by the image acquisition component of the second computing device. The state of the mobile application may relate to optical character recognition of the data acquired by the image acquisition component of the second computing device. The state of the mobile application may relate to a location in a series of interview screens.

In one or more embodiments, synchronizing the mobile application and the electronic tax preparation program includes adjusting a state of the mobile application in response to a change in a state of the electronic tax preparation program. The state of the electronic tax preparation program may relate to a location in a series of interview screens.

In one or more embodiments, the first processor is configured to automatically advance a state of the electronic tax preparation program in response to a state of the mobile application being advanced.

In one or more embodiments, the second processor is configured to automatically advance a state of the mobile application in response to a state of the electronic tax preparation program being advanced.

In one or more embodiments, the server processor is configured to record respective states of the electronic tax preparation program and the mobile application. The image acquisition component may obtain an image of a tax document. The server processor may be configured to obtain tax information from the image of the tax document. The server processor may be configured to perform optical character recognition on the image of the tax document in order to obtain the tax information.

In one or more embodiments, the server processor generates a unique session identifier to facilitate communication between the first and second computing devices. The server processor may also generate an image acquisition request and send the image acquisition request to the second processor. The image acquisition request may include the unique session identifier. The image acquisition request may include an SMS message including a hyperlink. The second processor may activate the mobile application when the hyperlink is selected.

In one or more embodiments, the first processor generates and directs display of a summary page including acquired tax information. The summary page may also include an identification of a tax document from which the tax information was acquired. The first processor may send the summary page to the second computing device for display thereon.

In one or more embodiments, the first computing device is a stationary computing device.

BRIEF DESCRIPTION OF THE DRAWINGS

The foregoing and other aspects of embodiments are described in further detail with reference to the accompanying drawings, in which the same elements in different figures are referred to by common reference numerals, wherein.

Figure 1:
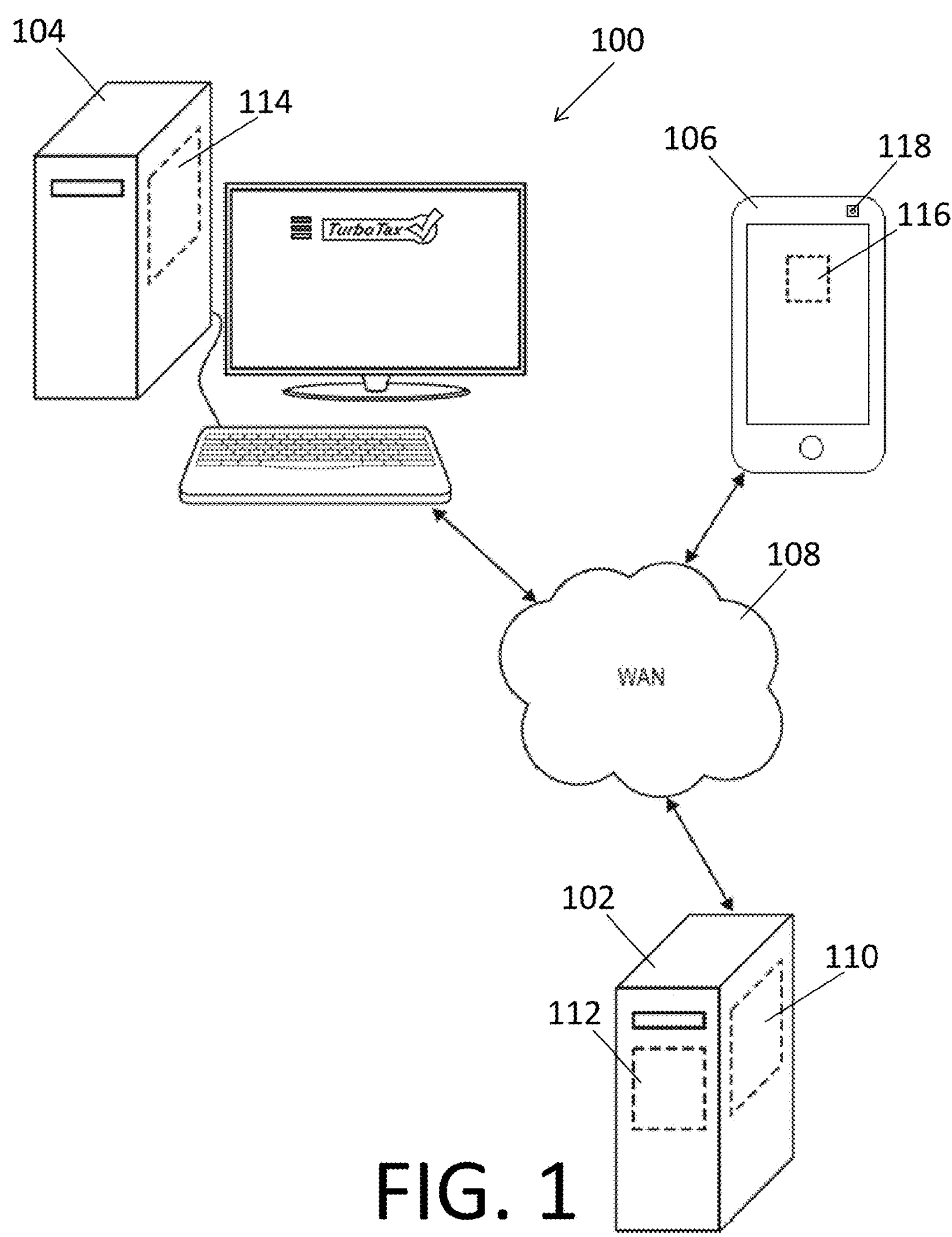
FIGS. 1 to 7 are schematic diagrams illustrating the implementation of synchronized tax data acquisition systems including on computing devices according to various embodiments.

In order to better appreciate how to obtain the above-recited and other advantages and objects of various embodiments, a more detailed description of embodiments is provided with reference to the accompanying drawings. It should be noted that the drawings are not drawn to scale and that elements of similar structures or functions are represented by like reference numerals throughout. It will be understood that these drawings depict only certain illustrated embodiments and are not therefore to be considered limiting of scope of embodiments.

DETAILED DESCRIPTION OF ILLUSTRATED EMBODIMENTS

Electronic tax return preparation programs can be accessed through/utilized by many different types of computers, including stationary (e.g., "desktop") computers and mobile (e.g., "laptop") computers. Mobile computers also include "hand-held" computers such as mobile communication devices (e.g., "smartphones"). Hand-held computers, such as smartphones, include components that may be missing from some stationary computers. For instance, smartphones may include an image acquisition component (e.g., a camera), which may be missing from at least some stationary computers. Therefore, users of electronic tax return preparation programs running on smartphones may have access to a camera, while those using electronic tax return preparation programs running on stationary computers may not. On the other hand, users may find that the electronic tax return preparation programs running on smartphones have limitations, such as those relating to smartphone user interfaces (e.g., lack of physical keyboard and limited display size). Accordingly, it may be desirable to facilitate a user preparing an electronic tax return using electronic tax return preparation programs (including different iterations thereof) running on both a stationary computer and a smartphone.

When preparing an electronic tax return using electronic tax return preparation programs running on both a stationary computer and a smartphone, the electronic tax return preparation programs, or different iterations thereof, may become unsynchronized. For example, when unsuccessfully using the camera on a smartphone to capture an image of a tax documents, the related electronic tax return preparation program running on the stationary computer may become "frozen" as it is unable to proceed until the image is captured.

Embodiments described in this application are directed to network-based synchronization systems for synchronizing electronic tax return preparation programs running on two computers (e.g., a stationary computer and a smartphone) to prepare a single electronic tax return. The embodiments address the computer-centric and Internet-centric problem of preventing instances of electronic tax return preparation programs running on two computers (coupled by the Internet) from having states that are different from each other. The embodiments also improve other technologies such as electronic tax return preparation, mobile applications, image analysis, and data acquisition.

In particular, an exemplary network-based synchronization system includes a server in communication with first and second computers through first and second networks, respectively. The network-based synchronization system is configured to synchronize programs utilized by the first and second computers. The first computer utilizes an electronic tax return preparation program. The second computer utilizes a mobile application. Tax document image acquisition systems having a server, and first and second computers are described in U.S. Utility patent application Ser. No. 13/781, 571 , entitled "TAX DOCUMENT IMAGING AND PROCESSING," the contents of which are fully incorporated herein by reference as though set forth in full.

As used in this application, a "preparer," "user" or "taxpayer" includes, but is not limited to, a person preparing a tax return using tax return preparation software. The "preparer," "user" or "taxpayer" may or may not be obligated to file the tax return. As used in this application, a "previous tax return" or "prior tax return" includes, but is not limited to, a tax return (in electronic or hard copy form) for a year before the current tax year. As used in this application, "tax data" includes, but is not limited to, information that may affect a user's income tax burden, including information typically included in a tax return. The term "tax data," as used in this application, also includes, but is not limited to, partially or fully completed tax forms (electronic, hard copy and images thereof) that include information typically included in a tax return. As used in this application, "tax document" includes, but is not limited to, physical documents containing tax data, and images thereof.

As used in this application, "computer," "computer device," or "computing device" includes, but are not limited to, a computer (laptop or desktop) and a computer or computing device of a mobile communication device, smartphone and tablet computing device such as an IPAD (available from Apple Inc. of Cupertino, Calif.). As used in this application, "tax preparation system," "tax preparation computing device," "tax preparation computer," "tax preparation software," "tax preparation module," "tax preparation application," "tax preparation program," "tax return preparation system," "tax return preparation computing device," "tax return preparation computer," "tax return preparation software," "tax return preparation module," "tax return preparation application," or "tax return preparation program" includes, but are not limited to, one or more separate and independent software and/or hardware components of a computer that must be added to a general purpose computer before the computer can prepare tax returns, and computers having such components added thereto.

As used in this application, "server" or "server computer" includes, but is not limited to, one or more separate and independent software and/or hardware components of a computer that must be added to a general purpose computer before the computer can receive and respond to requests from other computers and software in order to share data or hardware and software resources among the other computers and software, and computers having such components added thereto. As used in this application, "mobile computer" or "handheld computer" includes, but is not limited to, computers configured (e.g., having a form factor) to be held in a hand of a user during the normal course of use. As used in this application, "stationary computer" includes, but is not limited to, computers configured (e.g., having a form factor) to be stationary relative to a user during the normal course of use.

As used in this application, "mobile application" includes, but is not limited to, one or more separate and independent software components of a computer that must be added to a general purpose handheld computer before the handheld computer can run the mobile application. As used in this application, "synchronization program" includes, but is not limited to, one or more separate and independent software components of a computer that must be added to a general purpose computer before the computer can synchronize the respective states of a plurality of computer programs.

As used in this application, "input/output module" includes, but is not limited to, one or more separate and independent software and/or hardware components of a computer that must be added to a general purpose computer before the computer can communicate with and facilitate the receipt and transfer of information, including tax data and tax documents, from and to other computers. As used in this application, "memory module" includes, but is not limited to, one or more separate and independent software and/or hardware components of a computer that must be added to a general purpose computer before the computer can store information, including tax data and tax documents.

As used in this application, "camera controller" includes, but is not limited to, one or more separate and independent software and/or hardware components of a computer that must be added to a general purpose computer before the computer can control an image capture device. As used in this application, "synchronization module" includes, but is not limited to, one or more separate and independent software and/or hardware components of a computer that must be added to a general purpose computer before the computer can synchronize the respective states of a plurality of computer programs. As used in this application, "session identifier generator" includes, but is not limited to, one or more separate and independent software and/or hardware components of a computer that must be added to a general purpose computer before the computer can create a character string to synchronize the respective states of a plurality of computer programs. As used in this application, "state tracker" includes, but is not limited to, one or more separate and independent software and/or hardware components of a computer that must be added to a general purpose computer before the computer can receive and store the respective states of a plurality of computer programs.

As used in this application, "tax data extraction module" includes, but is not limited to, one or more separate and independent software and/or hardware components of a computer that must be added to a general purpose computer before the computer can obtain tax data from images of tax documents. As used in this application, "image quality module" includes, but is not limited to, one or more separate and independent software and/or hardware components of a computer that must be added to a general purpose computer before the computer can analyze the suitability of an image for data acquisition. As used in this application, "optical character recognition module" includes, but is not limited to, one or more separate and independent software and/or hardware components of a computer that must be added to a general purpose computer before the computer can obtain alphanumeric characters from images.

As used in this application, "website" includes, but is not limited to, one or more operatively coupled webpages. As used in this application, "browser" or "web browser" includes, but is not limited to, one or more separate and independent software and/or hardware components of a computer that must be added to a general purpose computer before the computer can receive, display and transmit resources from/to the World Wide Web.

FIG. 1 depicts an exemplary hardware system 100 on which a tax data acquisition system including a network-based synchronization system (i.e., a synchronized tax data acquisition system) according to one embodiment may be executed. The hardware system 100 according to this embodiment includes a server computer 102, and first and second computers 104, 106, all operative coupled by a network 108 (e.g., a WAN network like the Internet). The network 108 may also include a private communication network 108, such as a cellular data network. The first computer 104 may be a stationary computer (e.g., a desktop computer) and the second computer 106 may be a handheld computer (e.g., a smartphone) having an image acquisition device 118.

The synchronized tax data acquisition system includes an electronic tax return preparation program 110 and a synchronized tax data acquisition program 112 running on the server computer 102. Examples of electronic tax return preparation programs 110 that may be programmed to utilize tax data acquired by the synchronized tax data acquisition system according to embodiments include, but are not limited to, desktop or online versions of TURBOTAX, PROSERIES and LACERTE tax return preparation applications, available from Intuit Inc.; H&R BLOCK tax return preparation application available from H&R Block, Inc.; and TAXACT tax return preparation application available from TaxAct, Inc. TURBOTAX, PROSERIES AND LACERTE are registered trademarks of Intuit Inc., Mountain View, Calif. H&R BLOCK is a registered trademark of HRB Innovations, Inc., Las Vegas, Nev. TAXACT is a registered trademark of TaxAct, Inc., Cedar Rapids, Iowa. Notwithstanding the listing of these exemplary programs 110, synchronized tax data acquisition systems 112 according to the described embodiments are usable with all tax return preparation programs. The electronic tax return preparation program 110 and the synchronized tax data acquisition program 112 can communicate with each other through a bus (not shown).

The server computer 102 is specially or particularly configured or operable to host an on-line version of the electronic tax return preparation program 110 and the synchronized tax data acquisition program 112. The server computer 102 can also format and electronically file electronic tax returns with a computer of a tax authority. Examples of a tax authority or other tax collecting entity include a federal tax authority, e.g., the Internal Revenue Service (IRS), a state tax authority or other tax collecting entity of the United States, a state thereof, or another country or state thereof (generally, "tax authority"). Examples of hosts that provide the special purpose server computer 110 include, for example, Intuit Inc., which provides a server computer of the Intuit Electronic Filing Center for electronically filing tax returns, and other hosts that provide electronic tax return preparation programs 110 and electronic filing servers.

The synchronized tax data acquisition system also includes a browser 114 running on the first computer 104, where the browser 114 is configured to access the electronic tax return preparation program 110 and the synchronized tax data acquisition program 112 running on the server computer 102. The synchronized tax data acquisition system further includes a mobile application 116 running on the second computer 106. The mobile application may be a plug-in, such as a JAVA plug-in or a CHROME extension. The electronic tax return preparation program 110, the synchronized tax data acquisition program 112, the browser 114 and the mobile application 116 are all operative coupled by the network 108.

Figure 6:
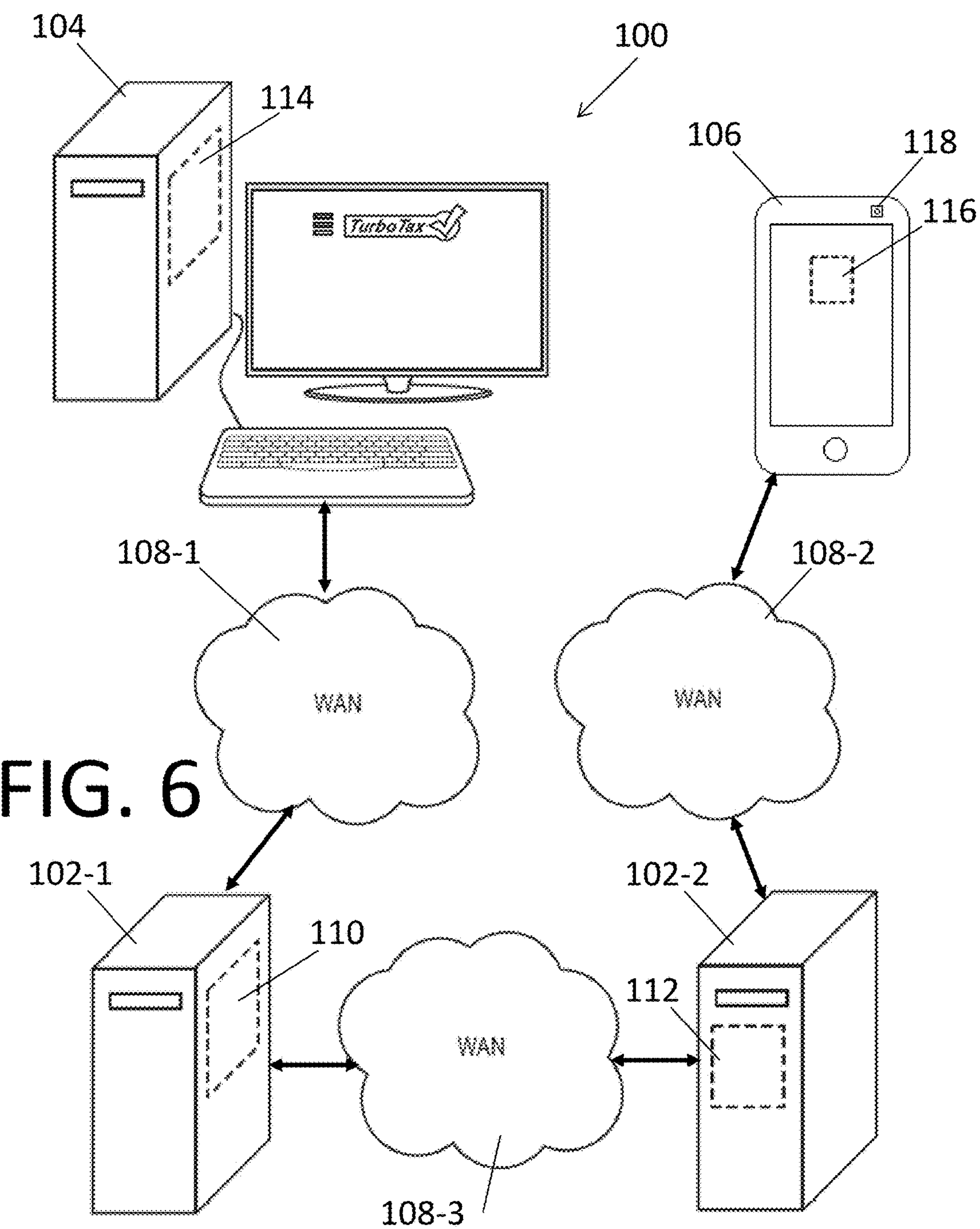
Figure 7:
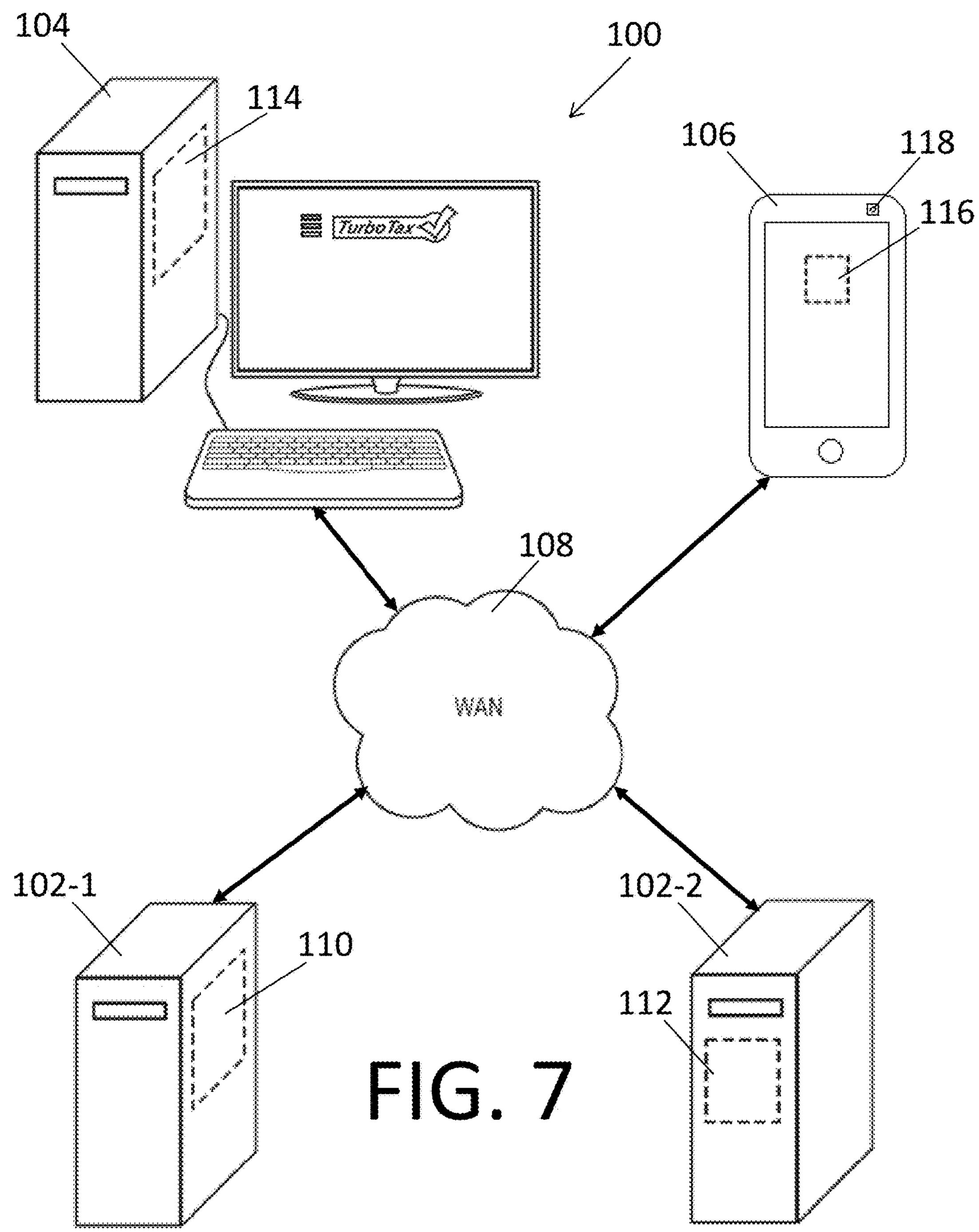

While FIG. 1 depicts the browser 114 is configured to access the electronic tax return preparation program 110 and the synchronized tax data acquisition program 112 as running on the same server computer 102, the browser 114 is configured to access the electronic tax return preparation program 110 and the synchronized tax data acquisition program 112 can run on different computers in other embodiments (see FIGS. 6 and 7). While FIG. 1 depicts the first computer 104 as a desktop computer, the first computer 104 can be any computing device without an imaging device, including a laptop computer. While FIG. 1 depicts the second computer 106 as a smartphone, the second computer 106 can be any mobile computing device, including a personal data assistance or tablet computing device (as shown in FIGS. 3 and 4).

Figure 2:
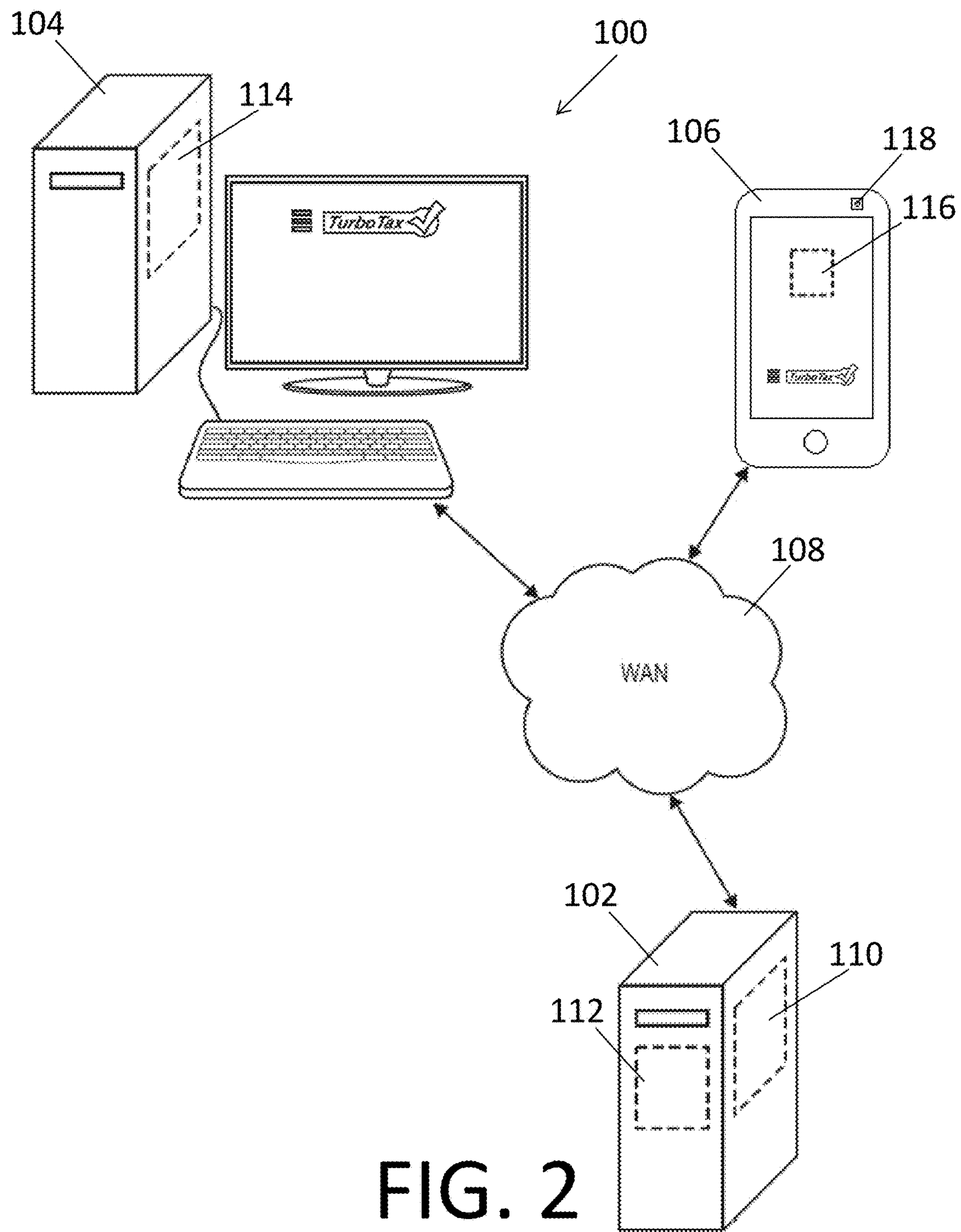

FIG. 2 depicts another exemplary hardware system 100 on which a synchronized tax data acquisition system according to another embodiment may be executed. The hardware system 100 depicted in FIG. 2 is identical to the hardware system 100 depicted in FIG. 1, however the synchronized tax data acquisition systems depicted in FIGS. 1 and 2 are different because the mobile application 116 depicted in FIG. 1 is configured to control only the image acquisition device 118. On the other hand, the mobile application 116 depicted in FIG. 1 is an instance of a mobile electronic tax return preparation program 116 that is also configured to control the image acquisition device 118. As a result, the synchronized tax data acquisition program 112 is configured to synchronize the respective states of the electronic tax return preparation program 110 running on the first computer 104 and the mobile electronic tax return preparation program 116 running on the second computer 106.

Figure 3:
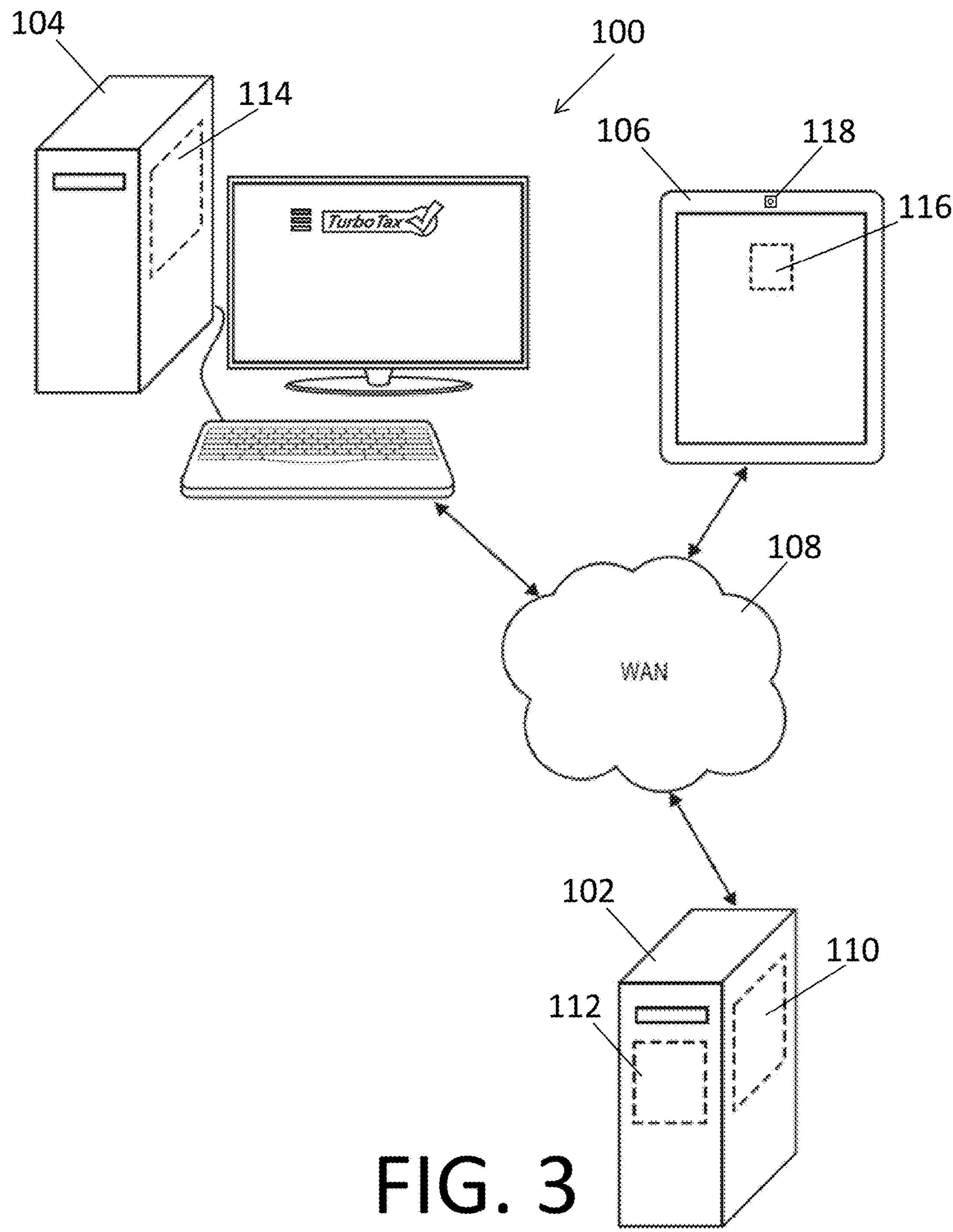
Figure 4:
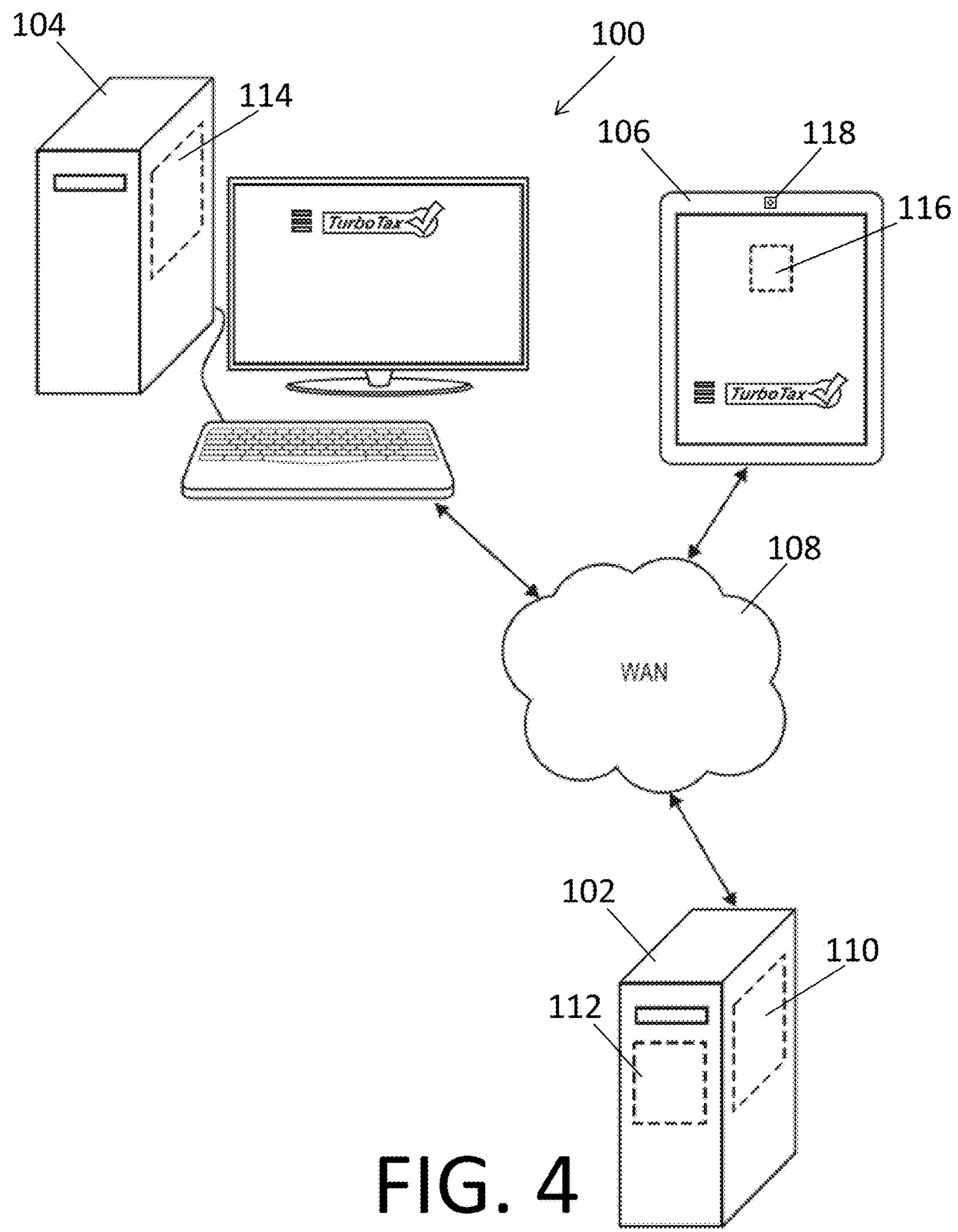

FIGS. 3 and 4 depict other exemplary hardware systems 100 on which respective synchronized tax data acquisition systems according to other embodiments may be executed. The hardware systems 100 depicted in FIGS. 3 and 4 are similar to those depicted in FIGS. 1 and 2, however the second computers 106 depicted in FIGS. 3 and 4 are tablet computing devices (instead of smartphones depicted in FIGS. 1 and 2).

Figure 5:
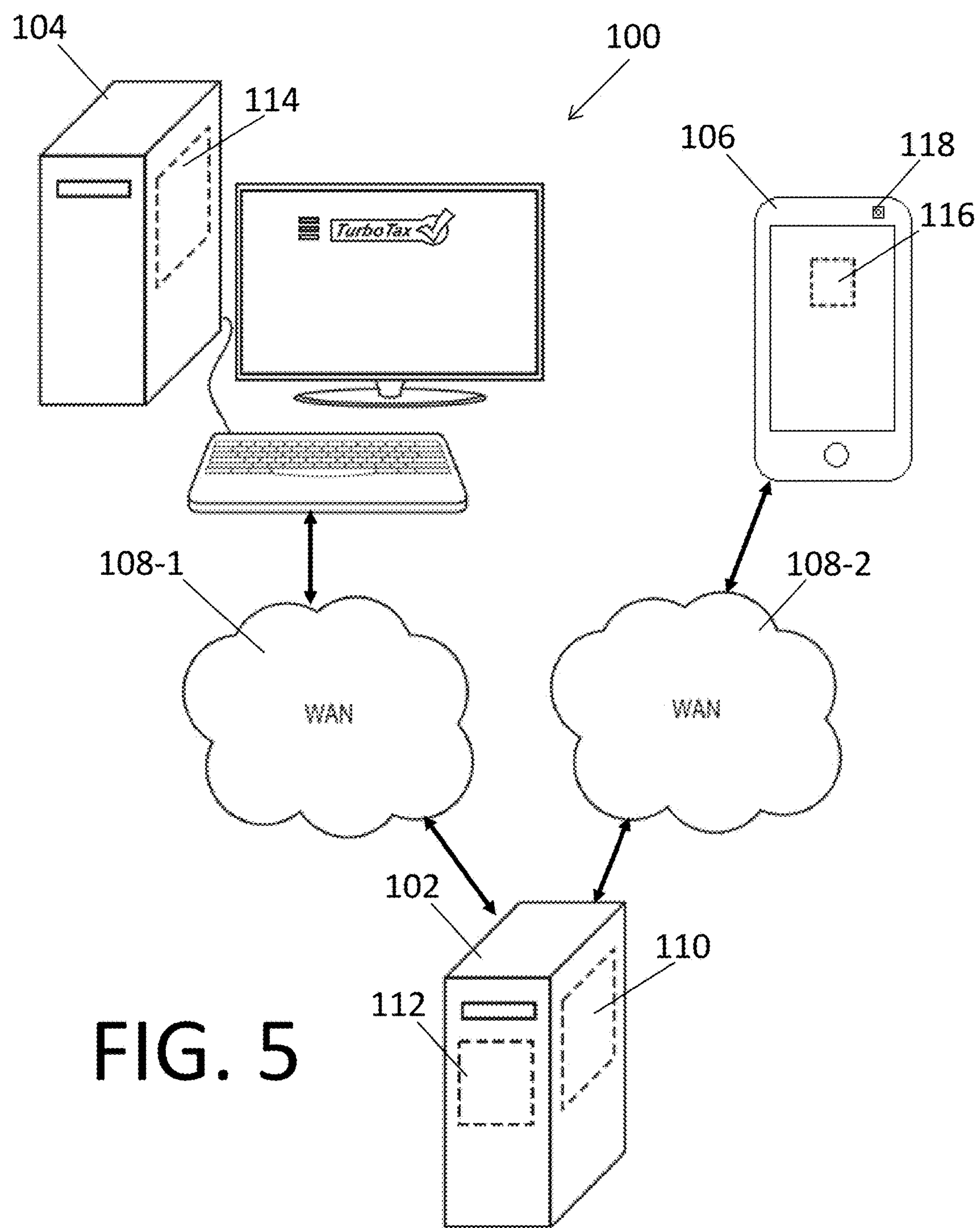

FIG. 5 depicts still another exemplary hardware system 100 on which a synchronized tax data acquisition system according to another embodiment may be executed. The hardware system 100 depicted in FIG. 5 is similar to the hardware system 100 depicted in FIG. 1. However, the first and second computers 104, 106 are operatively coupled to the server computer 102 by first and second networks 108-1, 108-2, respectively, instead of by the same network (as in FIG. 1). Each of the first and second networks 108-1, 108-2 may include a wide area network, such as the Internet and/or a private communication network 108, such as a cellular data network.

FIG. 6 depicts yet another exemplary hardware system 100 on which a synchronized tax data acquisition system according to another embodiment may be executed. The hardware system 100 depicted in FIG. 6 is similar to the hardware system 100 depicted in FIG. 5. However, the system includes first and second server computers 102-1, 102-2, instead of a single server computer (as in FIG. 5). The electronic tax return preparation program 110 runs on the first server computer 102-1. The synchronized tax data acquisition program 112 runs on the second server computer 102-2. The first and second computers 104, 106 are respectively operatively coupled to the first and second server computers 102-1, 102-2 by first and second networks 108-1, 108-2. The first and second server computers 102-1, 102-2 are operatively coupled to each other by a third network 108-3. Each of the first, second and third networks 108-1, 108-2, 108-3 may include a wide area network, such as the Internet and/or a private communication network 108, such as a cellular data network.

FIG. 7 depicts still another exemplary hardware system 100 on which a synchronized tax data acquisition system according to another embodiment may be executed. The hardware system 100 depicted in FIG. 7 is similar to the hardware system 100 depicted in FIG. 6. However, the first and second server computers 102-1, 102-2 and the first and second computers 104, 106 are operatively coupled together by a single network 108, instead of multiple networks (as in FIG. 6). The electronic tax return preparation program 110 runs on the first server computer 102-1. The synchronized tax data acquisition program 112 runs on the second server computer 102-2. The networks 108 may include a wide area network, such as the Internet and/or a private communication network 108, such as a cellular data network.

While FIGS. 1-7 depict one pair of first and second computers 104, 106 operatively coupled to the server computer 102, in other embodiments, a plurality of pairs of first and second computers (not shown) may be operatively coupled to the server computer 102 simultaneously for synchronized tax data acquisition. Each pair of first and second computers may be used by a separate user. Accordingly, each pair of first and second computers is identified with a unique session identifier to reduce the risk of unintended dissemination of confidential tax information.

While the electronic tax return preparation programs 110 depicted in FIGS. 1-7 run on respective server computers 102 and are accessed through respective browsers 114 running on respective first computers 104, in other embodiments, the electronic tax return preparation program may be a local program running on the first computer. For ease of explanation, reference is made generally to electronic tax return preparation program 110. Similarly, while the mobile applications 116 depicted in FIGS. 1-7 run on respective second computers 106, in other embodiments, a program performing the same functions as the above-described mobile applications may run on the server computer, and be accessed through a mobile browser running on the second computer 106. For ease of explanation, reference is made generally to mobile application 116. Some or all of the various computers 102, 104, 106 include visual displays or screens operatively coupled thereto.

Each of the networks 108 discussed herein (generally, network 108) may be two or more different but interconnected networks depending on the system configuration and communication protocols employed. The network 108 may include, for example, a wireless or cellular network, a Local Area Network (LAN) and/or a Wide Area Network (WAN). Reference to network 108 generally is not intended to refer to a specific network or communications protocol, and embodiments can be implemented using various networks and combinations thereof.

Figure 8:
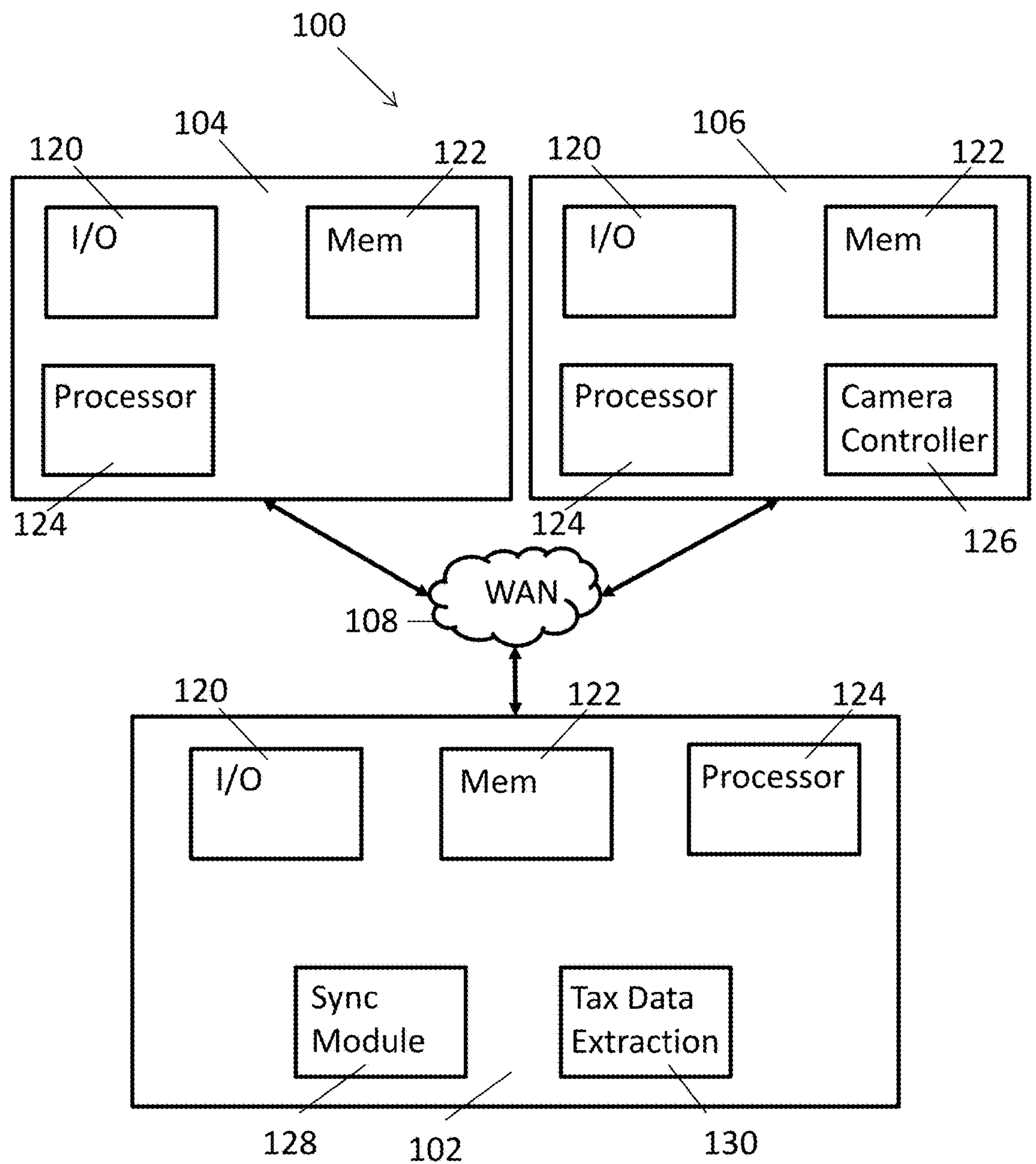
FIGS. 8 to 10 are block diagrams of computer systems according to various embodiment on which a synchronized tax data acquisition system may be implemented.

FIG. 8 depicts, in greater detail, another hardware system 100 configured to host a synchronized tax data acquisition system according to one embodiment. Like the hardware systems 100 depicted in FIGS. 1-4, the hardware system 100 in FIG. 8 includes a server computer 102 and first and second computers 104, 106, all operatively coupled by a network 108. The first computer 104 includes an input/output module 120, a memory module 122 and a processor 124 (i.e., a first processor). The second computer 104 includes an input/output module 120, a memory module 122, a processor 124 (i.e., a second processor) and a camera controller. The server computer 102 includes an input/output module 120, a memory module 122, a processor 124 (i.e., a server processor), a synchronization module 128 and a tax data extraction module 130. The input/output modules 120 are configured to communicate with and facilitate the receipt and transfer of tax data, including images of tax documents, from and to various computers (e.g., server computer 102, first computer 104, and second computer 106) for tax data acquisition. The memory modules 122 are configured to store tax data, including images of tax documents, in proper formats for tax data acquisition. The user processors 124 are configured to run respectively programs (i.e., electronic tax return preparation program 110, synchronized tax data acquisition program 112, browser 114 and mobile application 116).

The camera controller 126 is configured to control an image acquisition device 118 for acquiring images (e.g., of tax documents). The synchronization module 128 is configured to synchronize the respective states of a plurality of programs running on a plurality of computers. The plurality of programs may be instances of a single program (e.g., the electronic tax return preparation program 110). The tax data extraction module 130 is configured to obtain tax data from images of tax documents.

Figure 9:
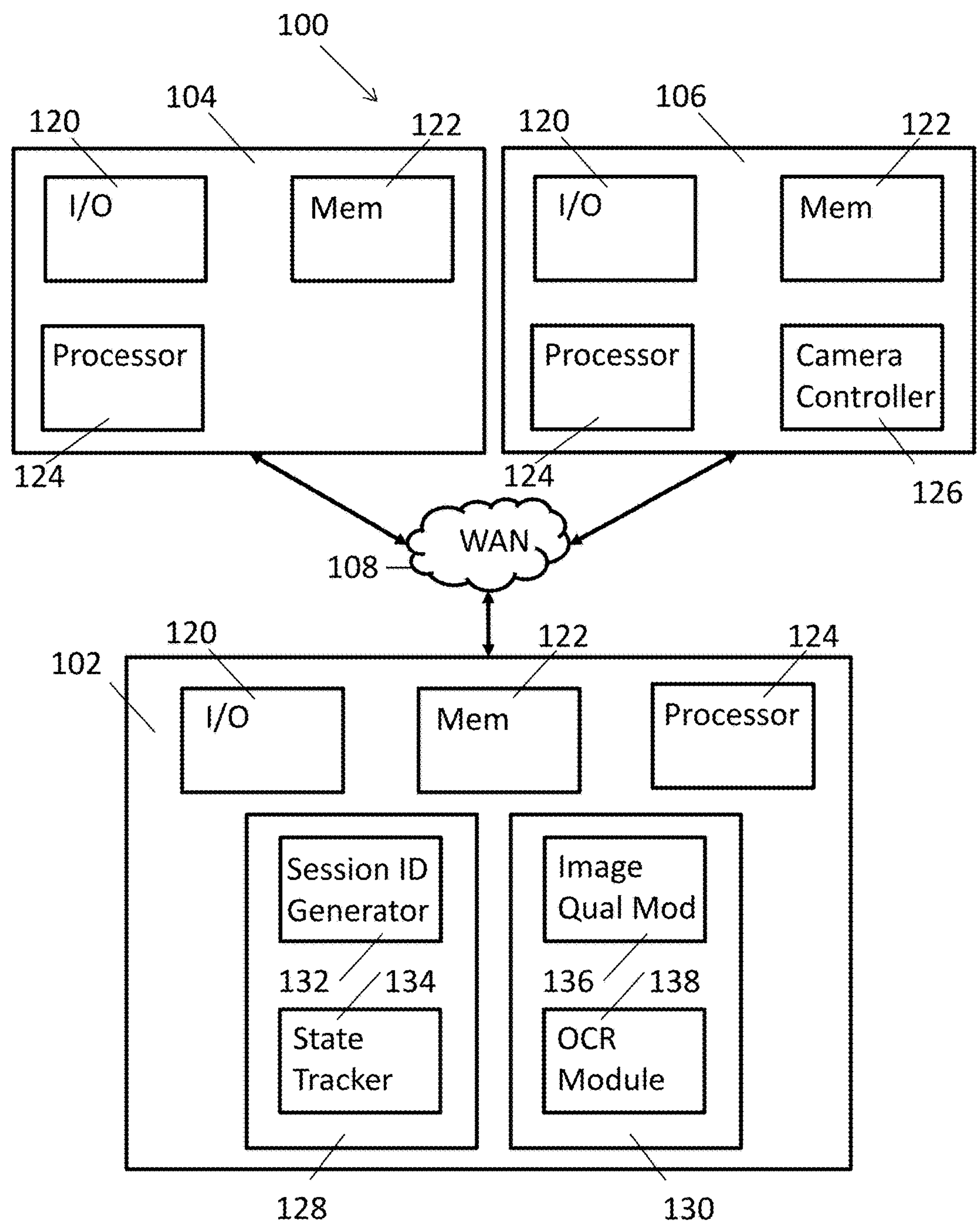

FIG. 9 depicts, in even greater detail, another hardware system 100 configured to host a synchronized tax data acquisition system according to one embodiment. Like the hardware systems 100 depicted in FIGS. 1-4 and 8, the hardware system 100 in FIG. 9 includes a server computer 102 and first and second computers 104, 106, all operatively coupled by a network 108. The system configuration, the computers 102, 104, 106 and the various components and modules depicted in FIG. 9 are similar to those depicted in FIG. 8. The synchronization module 128 and tax data extraction module 130 are depicted in greater detail in FIG. 9.

Figure 10:
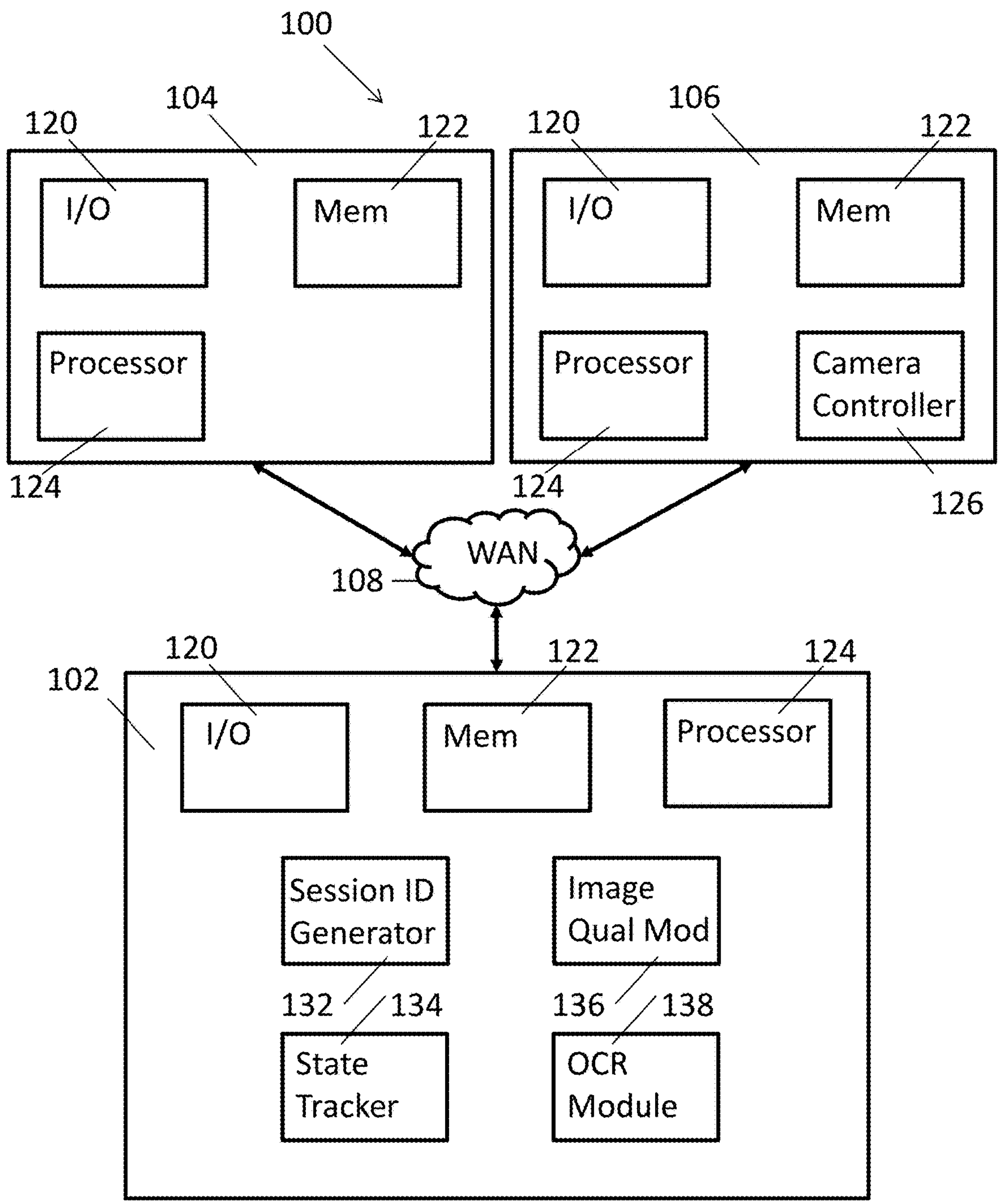

The synchronization module 128 includes a session identifier generator 132 and a state tracker 134. The session identifier generator 132 is configured to create a unique character string ("session identifier") utilized to synchronize the respective states of a plurality of computer programs. In systems with a plurality of pairs of computers to be independently synchronized, the unique session identifiers (generated by the synchronization module 128) reduce the likelihood of a first computer being mistakenly synchronized with the wrong second computer. The unique session identifiers also reduce the likelihood of unintended dissemination of confidential tax information. The state tracker 134 is configured to receive and store the respective states of a plurality of computer programs. While FIG. 9 depicts the session identifier generator 132 and the state tracker 134 as parts of the synchronization module 128, these components/modules may be separately found in the server computer 102, as shown in FIG. 10.

The tax data extraction module 130 includes an image quality module 136 and an optical character recognition ("OCR") module 138. The image quality module 136 is configured to analyze the suitability of an image (e.g., of a tax document) for data acquisition. The image qualify module can compare various characteristics of a tax document image (e.g., brightness, focus, contrast, etc.) to respective thresholds to determine the suitability of the image. The OCR module 138 includes is configured to obtain alphanumeric characters from images. While FIG. 9 depicts the image quality module 136 and the OCR module 138 as parts of the tax data extraction module 130, these components/modules may be separately found in the server computer 102, as shown in FIG. 10.

Figure 11:
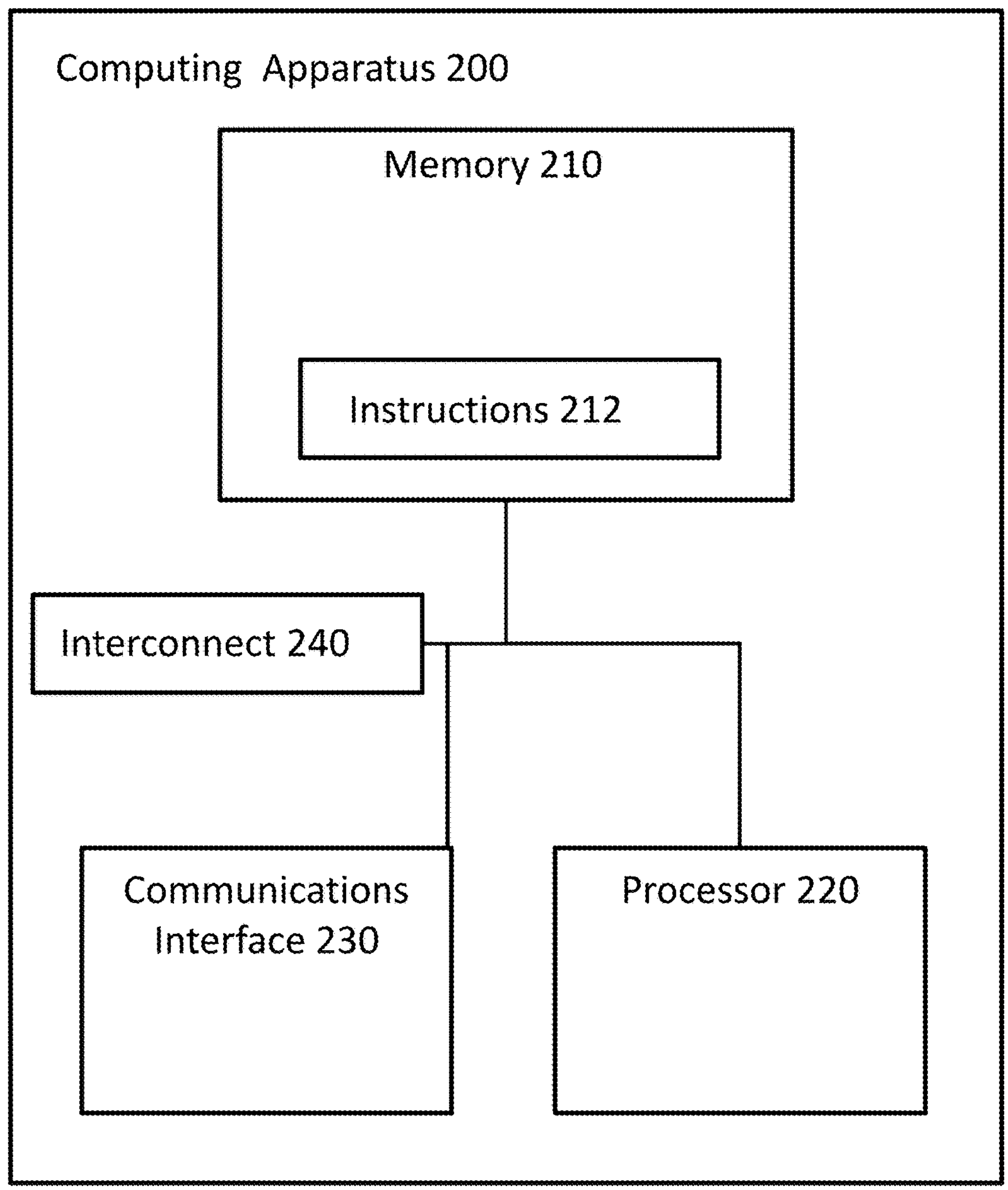
FIG. 11 is a block diagram of a computing apparatus or system in which various embodiments may be implemented or that may be utilized to execute various embodiments.

FIG. 11 generally illustrates certain components of a computing device 200 that may be utilized to execute embodiments and that includes a memory 210, program instructions 212, a processor or controller 220 to execute instructions 212, a network or communications interface 230, e.g., for communications with a network or interconnect 240 between such components. The memory 210 may be or include one or more of cache, RAM, ROM, SRAM, DRAM, RDRAM, EEPROM and other types of volatile or non-volatile memory capable of storing data. The processor unit 220 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 240 may include a system bus, LDT, PCI, ISA, or other types of buses, and the communications or network interface may, for example, be an Ethernet interface, a Frame Relay interface, or other interface. The network interface 230 may be configured to enable a system component to communicate with other system components across a network which may be a wireless or various other networks. It should be noted that one or more components of computing device 200 may be located remotely and accessed via a network. Accordingly, the system configuration provided in FIG. 11 is provided to generally illustrate how embodiments may be configured and implemented. The processors 124 in the server computer 102, the first computer 104 and the second computer 106 are programmed with respective electronic tax return preparation program 110, synchronized tax data acquisition program 112, browser 114 and mobile application 116 so that they are no longer generic computers.

Having described various aspects of synchronized tax data acquisition systems according to various embodiments, computer-implemented methods for acquiring tax data using the synchronized tax data acquisition systems will now be described. The methods also include synchronizing the states of a plurality of programs used to acquire the tax data.

Figure 12:
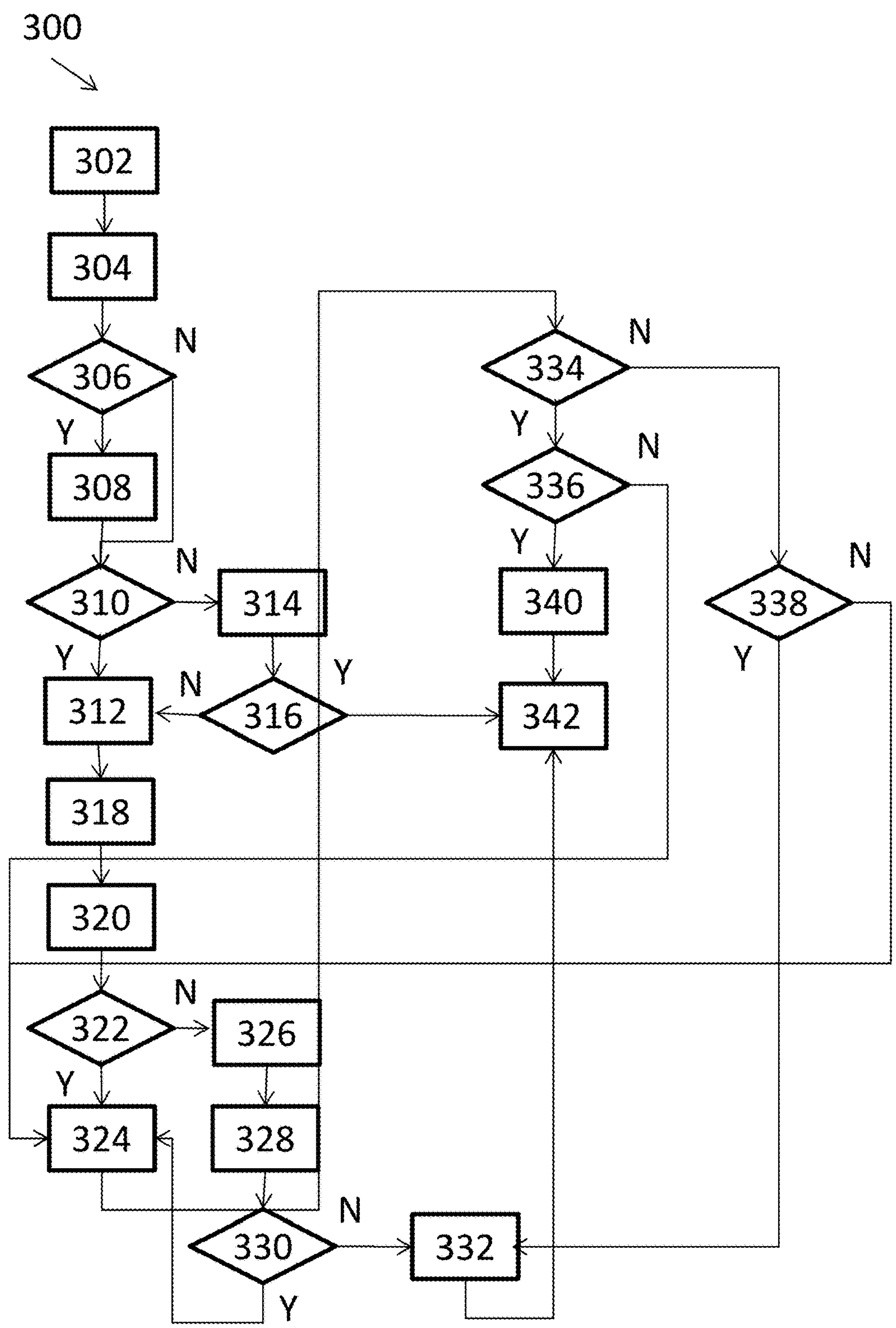
FIGS. 12 and 26 are flow charts depicting a synchronized computer implemented methods of acquiring tax data according to one embodiment.

FIG. 12 depicts a computer-implemented method 300 for acquiring tax data from tax documents executed according to one embodiment by a synchronized tax data acquisition system running on a hardware system 100, as shown in FIGS. 1 to 10 for example. The synchronized tax data acquisition system can include an electronic tax return preparation program 110 and a synchronized tax data acquisition program 112, both running on a server computer 102. The synchronized tax data acquisition system can also include a browser 114 running on a first computer 104, and configured to access the electronic tax return preparation program 110 and the synchronized tax data acquisition program 112. The synchronized tax data acquisition system can further include a mobile application 116 running on a second computer 106. The electronic tax return preparation program 110, the synchronized tax data acquisition program 112, the browser 114 and the mobile application 116 can be operatively coupled by at least one network 108. Method 300 runs on the first computer 104 and the server 102. Method 300 is operatively coupled to method 400 depicted in FIG. 26, which runs on the second computer 106 and the server 102.

Figure 13:
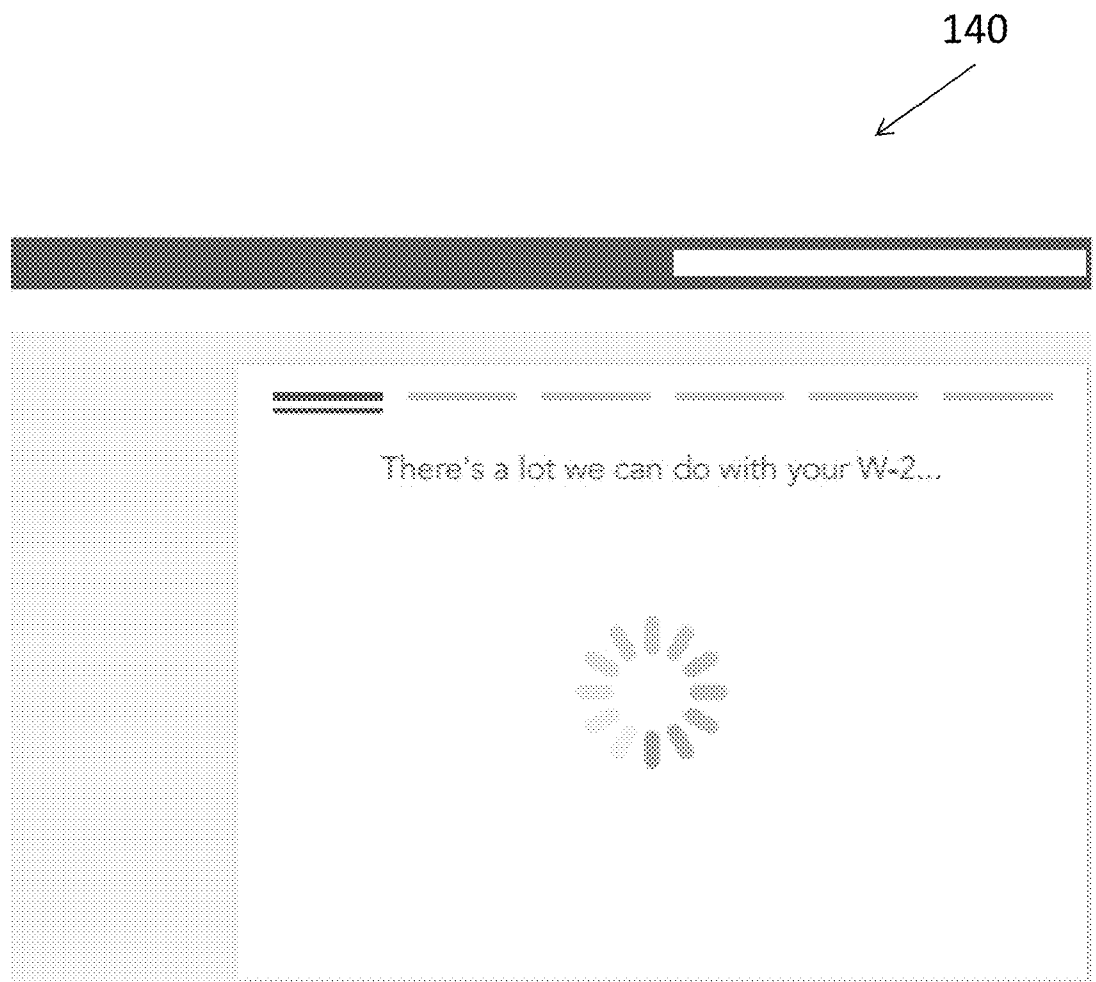
FIGS. 13 to 25 and 27 to 37 are exemplary screen shots displayed during execution of a synchronized tax data acquisition system on a computer system according to one embodiment.

At step 302, the synchronized tax data acquisition system displays a message on a user interface 140 on a first computer 104 informing a user that tax data can be acquired from a tax document (e.g., a W-2), as shown in FIG. 13. The user interface 140 may be part of a webpage displayed via the browser 114 running on a first computer 104 of the user. The browser 114 (or another instance of a browser 114) running on the first computer 104 may also access an electronic tax return preparation program 110, which is configured to prepare a tax return using, in part, tax data from the synchronized tax data acquisition system.

Figure 14:
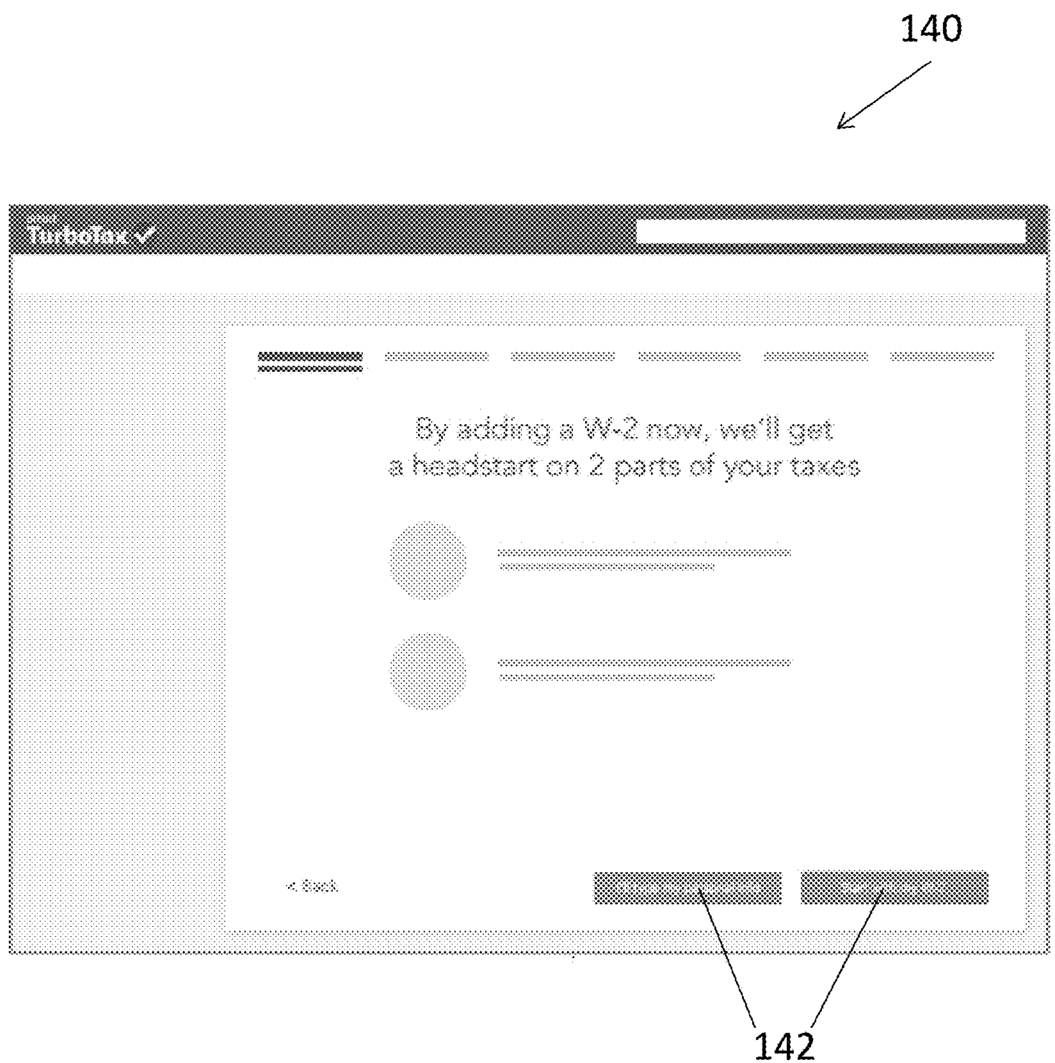

At step 304, the synchronized tax data acquisition system displays a message on the user interface 140 on the first computer 104 asking the user to choose between two methods of acquiring tax data from a W-2 (typing or machine acquisition (i.e., "start with my W-2")), as shown in FIG. 14. The user interface 140 includes two user interface objects 142 configured to allow the user to select between the two methods of acquiring tax data.

At step 306, the synchronized tax data acquisition system determines whether the W-2 must be assigned to a particular taxpayer. The synchronized tax data acquisition system can make this determination automatically (e.g., by noting that the tax return is for a married couple). The synchronized tax data acquisition system can also make this determination by seeking user input through the user interface (not shown). If the synchronized tax data acquisition system determines that the W-2 must be assigned to a particular taxpayer, the synchronized tax data acquisition system proceeds to step 308. Otherwise, the synchronized tax data acquisition system proceeds to step 310, bypassing step 308.

Figure 15:
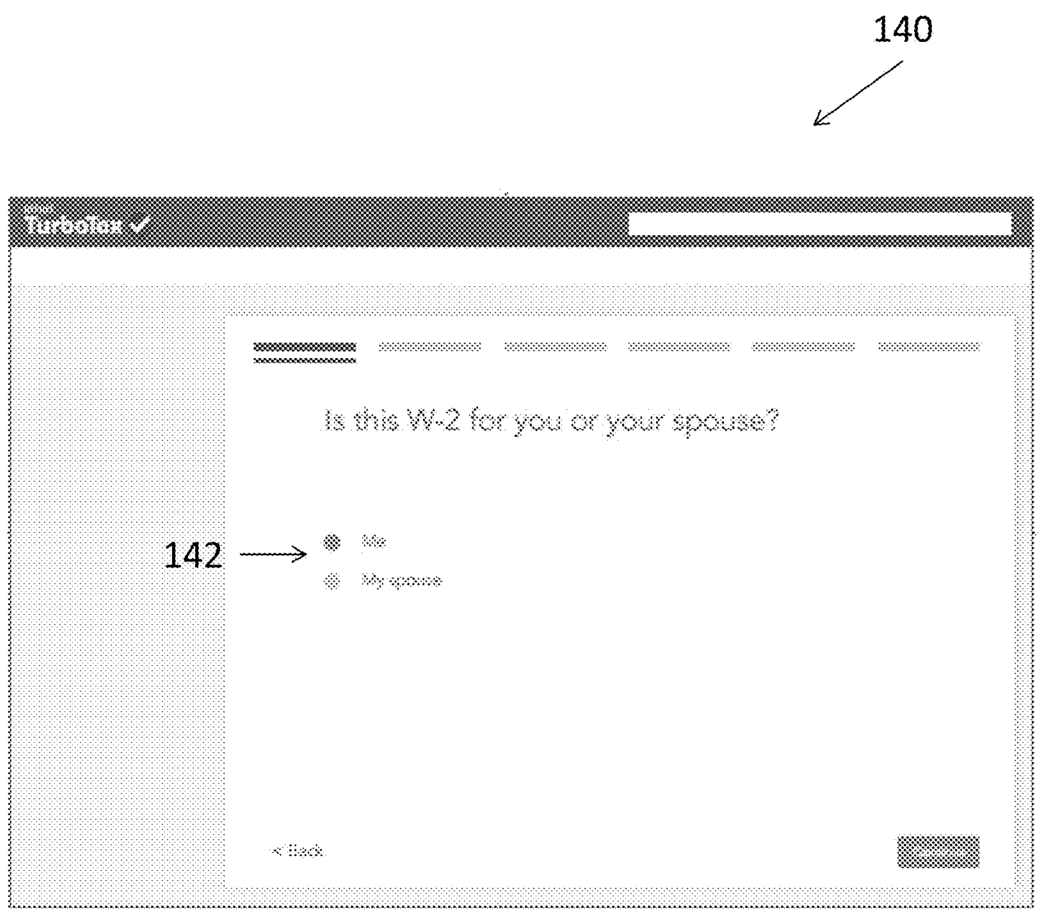

At step 308, the synchronized tax data acquisition system displays a message on the user interface 140 on the first computer 104 asking the user to assign the W-2, as shown in FIG. 15. The user interface 140 includes two user interface objects 142 configured to allow the user to assign the W-2 to the taxpayer or their spouse. In other embodiments, the synchronized tax data acquisition system may display a message and user interface objects 142 configured to allow the user to assign the W-2 to other taxpayers as appropriate.

At step 310, the synchronized tax data acquisition system determines whether the user intends to take a picture of the W-2 or to attempt to import the data in the W-2. The synchronized tax data acquisition system can make this determination by seeking user input through the user interface (not shown). If the synchronized tax data acquisition system determines that the user intends to take a picture of the W-2, the synchronized tax data acquisition system proceeds to step 312. Otherwise, the synchronized tax data acquisition system proceeds to step 314, bypassing step 312.

Figure 16:
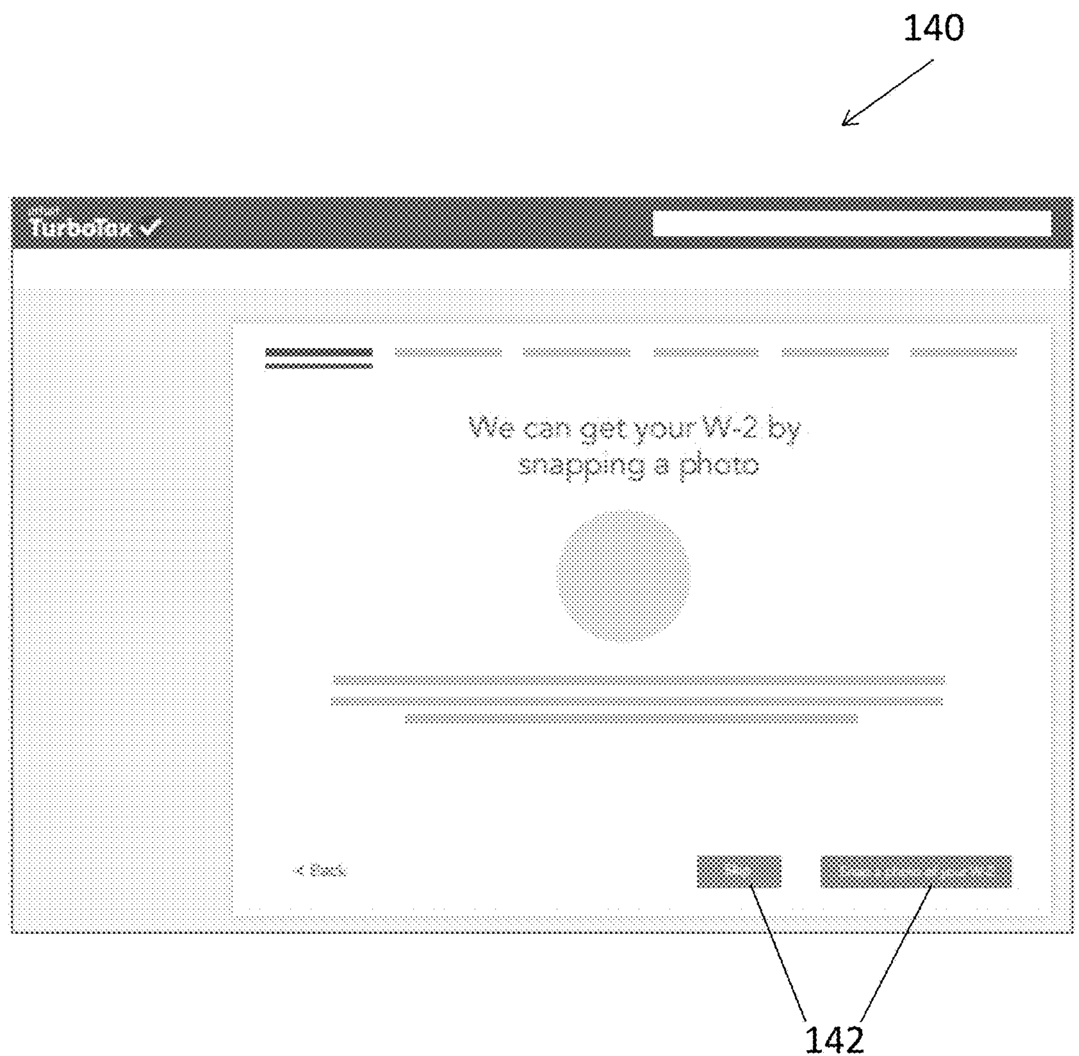

At step 312, the synchronized tax data acquisition system displays a message on the user interface 140 on the first computer 104 asking the user to proceed to taking a picture of the W-2, as shown in FIG. 16. The user interface 140 includes two user interface objects 142 configured to allow the user to proceed to taking a picture of the W-2, or backing out of the picture taking process. From step 312, the synchronized tax data acquisition system moves onto step 318.

At step 314, the synchronized tax data acquisition system attempts to import the W-2 information (e.g., using an API for a payroll processor). At step 316, the synchronized tax data acquisition system determines whether the W-2 information import was successful (e.g., using the API). If the synchronized tax data acquisition system determines that the W-2 information was successfully imported, the synchronized tax data acquisition system proceeds to the end of the method at step 342. If the synchronized tax data acquisition system determines that the W-2 information was not successfully imported, the synchronized tax data acquisition system proceeds to step 312, as described above. From step 312, the synchronized tax data acquisition system moves onto step 318.

Figure 17:
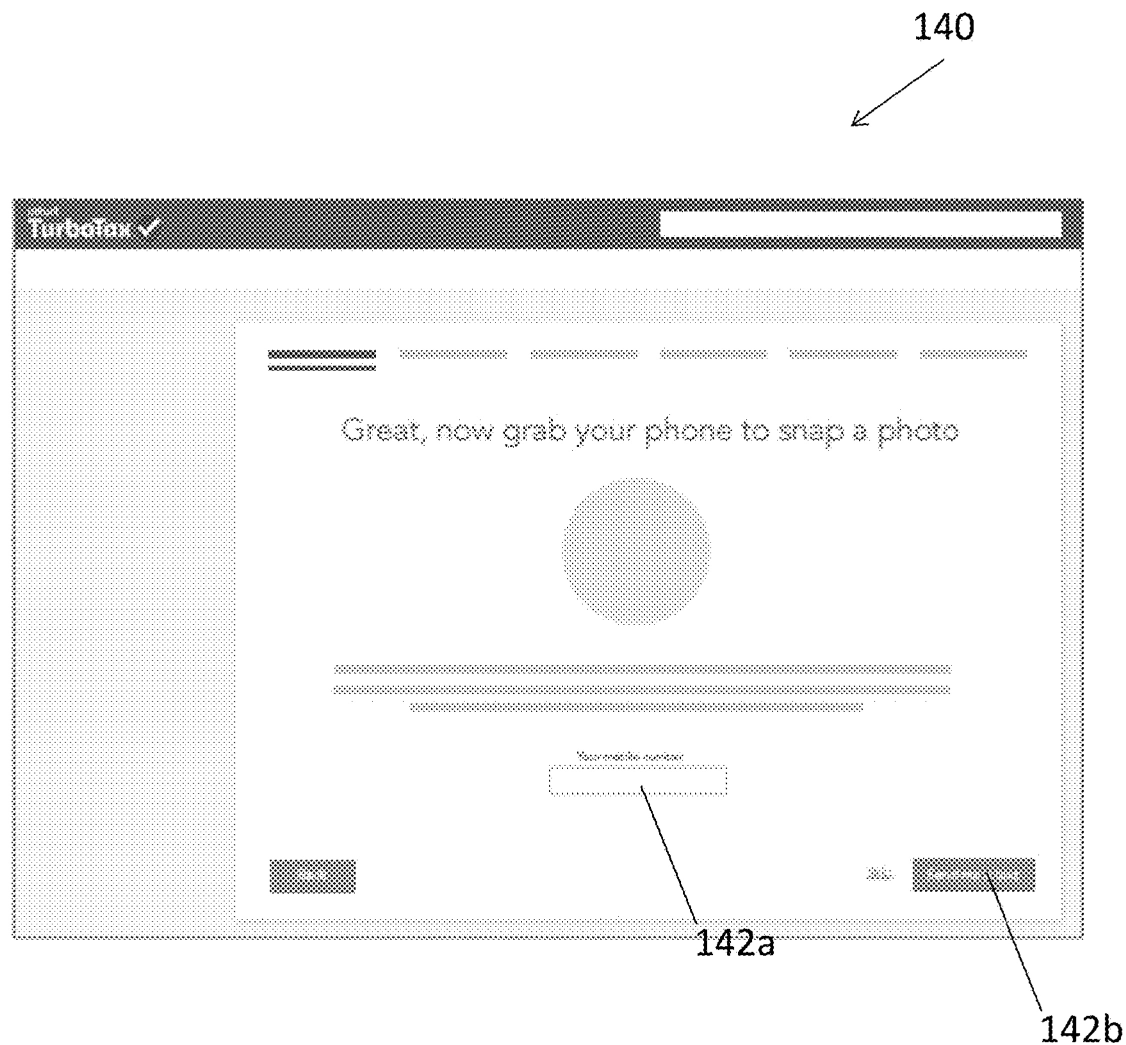

At step 318, the synchronized tax data acquisition system displays a message on the user interface 140 on the first computer 104 asking the user to provide a mobile phone number to connect the mobile phone 106 to the synchronized tax data acquisition system, as shown in FIG. 17. The user interface 140 includes a first user interface object 142*a* (e.g., a number entry box) configured to allow the user to enter the mobile phone number. The user interface 140 also includes a second user interface object 142*b* configured to allow the user to proceed to step 320. As with many other user interfaces 140 displayed during this method 300, this user interface 140 includes other user interface objects configured to cancel the picture taking process or go back a step in the method.

Beginning at step 318, the synchronized tax data acquisition system begins to synchronize the first computer 104 (stationary computer, which is running method 300) with the second computer 106 (mobile phone, which is running method 400). The session identifier generator 132 running on the server computer 102 creates a unique session identifier, and sends it to at least the first computer 104. In some embodiments, the server computer 102 also sends the unique session identifier to the second computer 106 after the session is established. All further communications between the first and second computers 104, 106 include the unique session identifier to authenticate the communications.

Figure 18:
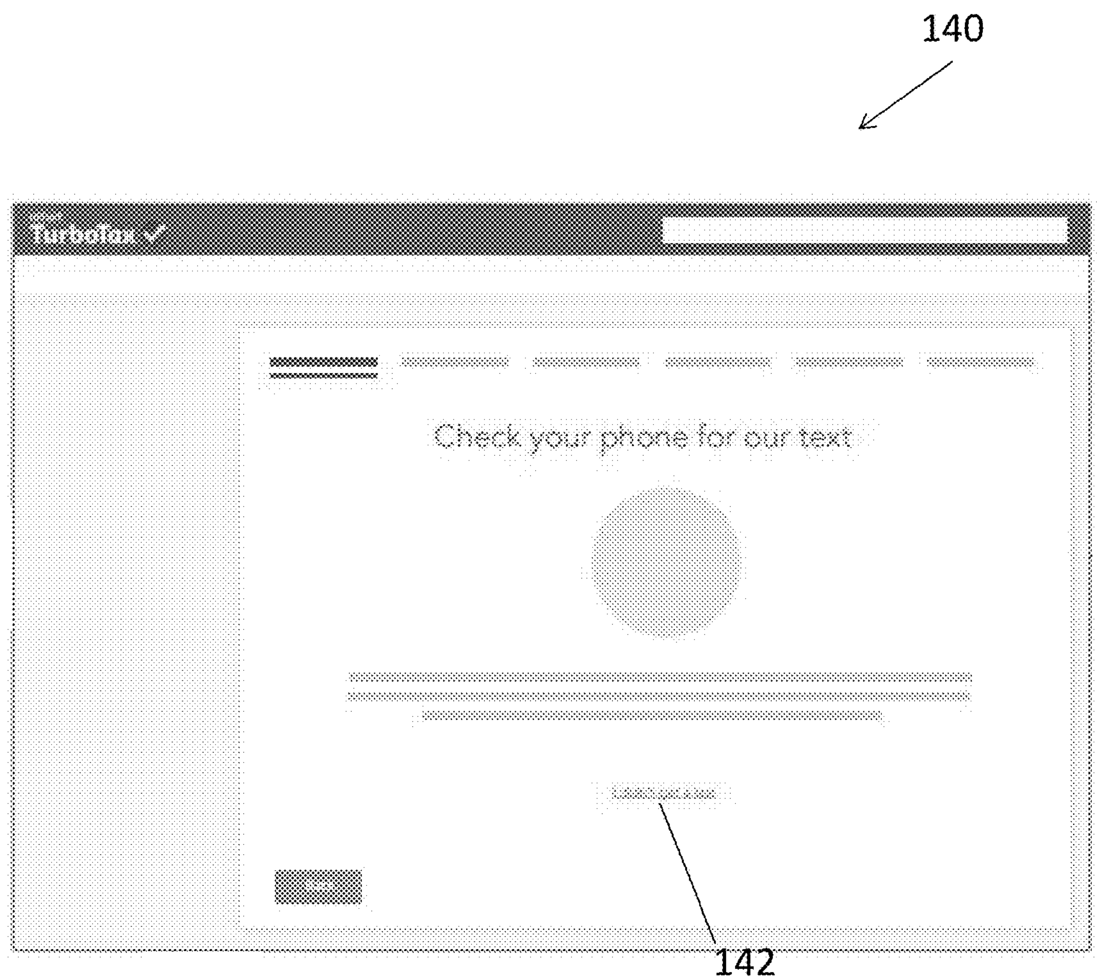

At step 320, the synchronized tax data acquisition system sends an SMS text message (or "SMS message") to the mobile phone number provided by the user at step 318. The SMS text message (shown in FIG. 27 and discussed below) includes the unique session identifier and a link to activate the mobile application 116 on the mobile phone 106. The synchronized tax data acquisition system also displays a message on the user interface 140 on the first computer 104 asking the user to "check your phone for our text," as shown in FIG. 18. The user interface 140 includes a user interface object 142 configured to allow the user to indicate that no SMS text message was received at the mobile phone 106.

Figure 38:
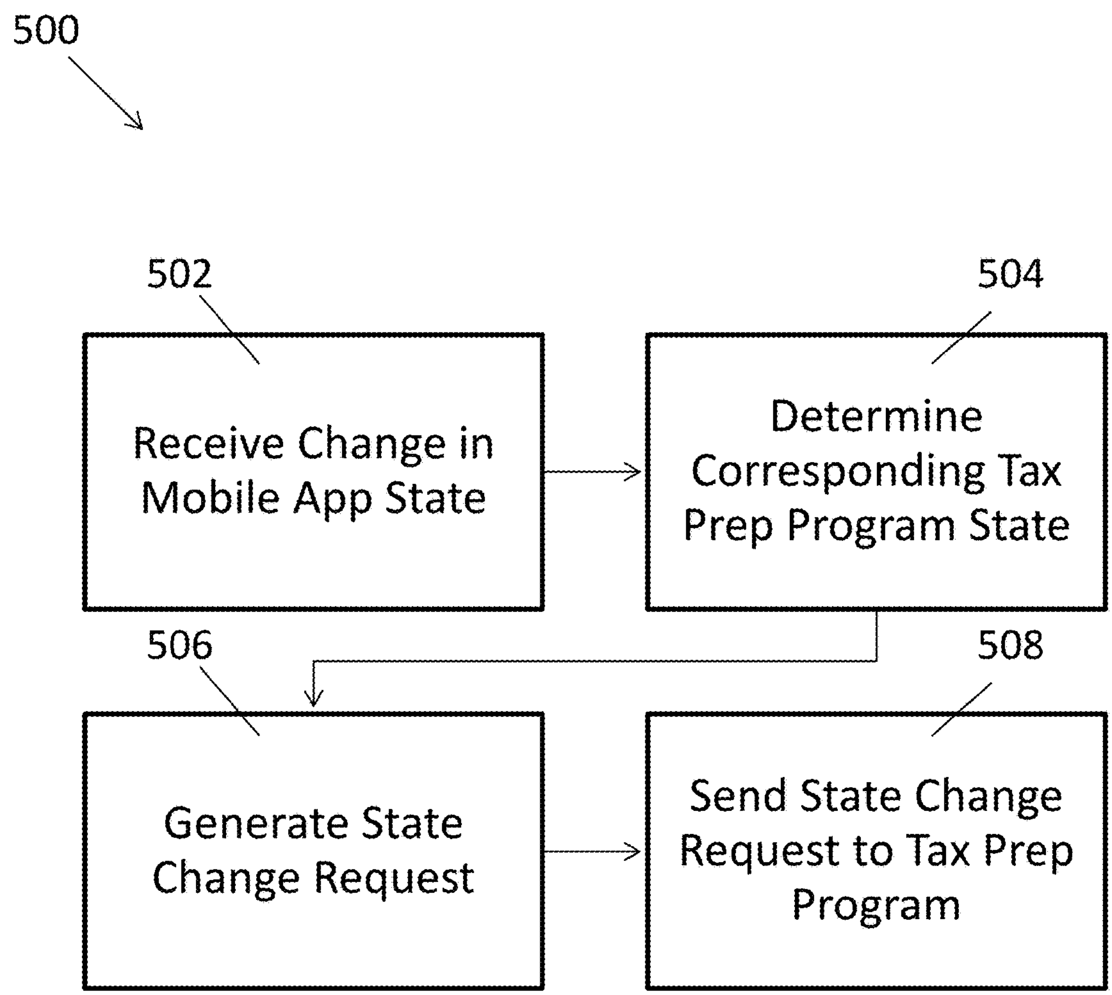
FIGS. 38 and 39 are flow charts depicting computer implemented methods of synchronizing tax data acquisition according to various embodiments.
Figure 39:
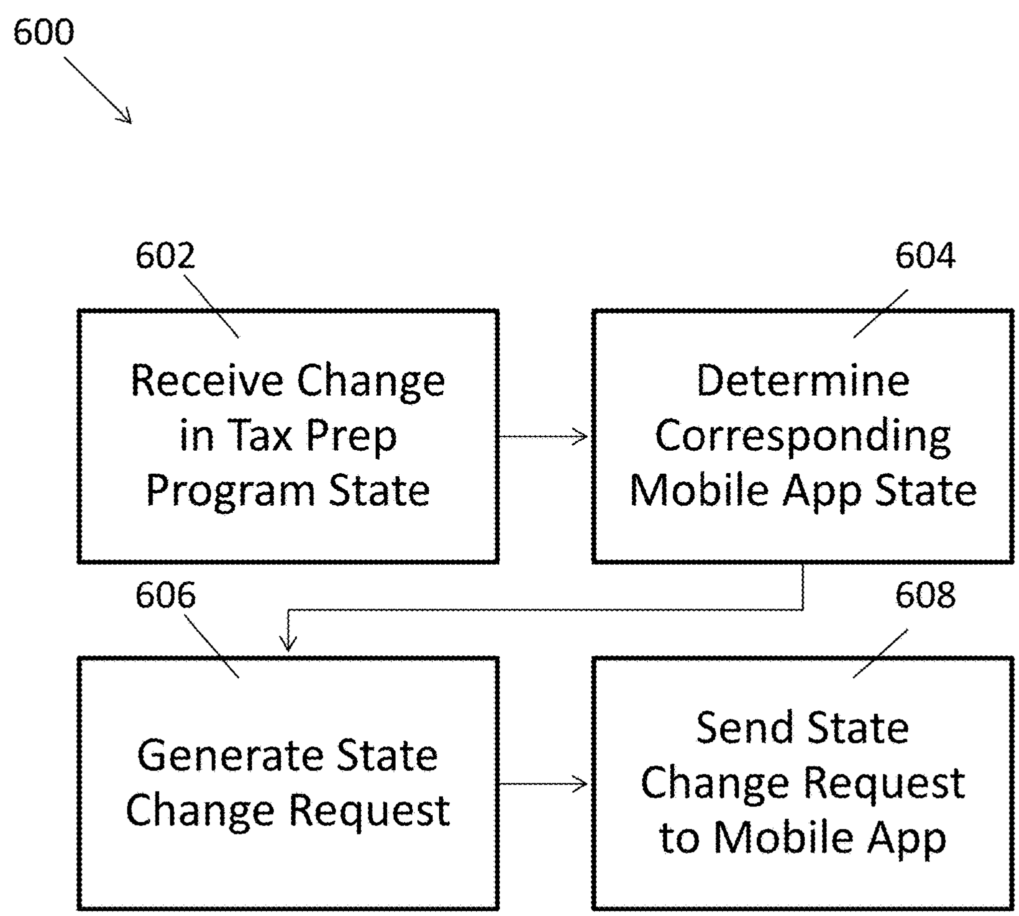

At step 322, the synchronized tax data acquisition system determines whether the user received the SMS text message sent in step 320 (e.g., with input from the user using the user interface 140 in FIG. 18). If the user indicates receipt of the SMS text message (e.g., by interacting with the SMS text message on the mobile phone 106), the synchronized tax data acquisition system proceeds to step 324, which is placeholder for the method 400 for acquiring tax data from tax documents depicted in FIG. 26. After the first and second computers 104, 106 are operatively coupled, the state tracker 134 begins to receive and store the respective states of first and second computers 104, 106 to synchronize these states at each step, as depicted in FIGS. 38 and 39 and described below. If the user indicates that the SMS text message was not received, the synchronized tax data acquisition system proceeds to step 326.

Figure 19:
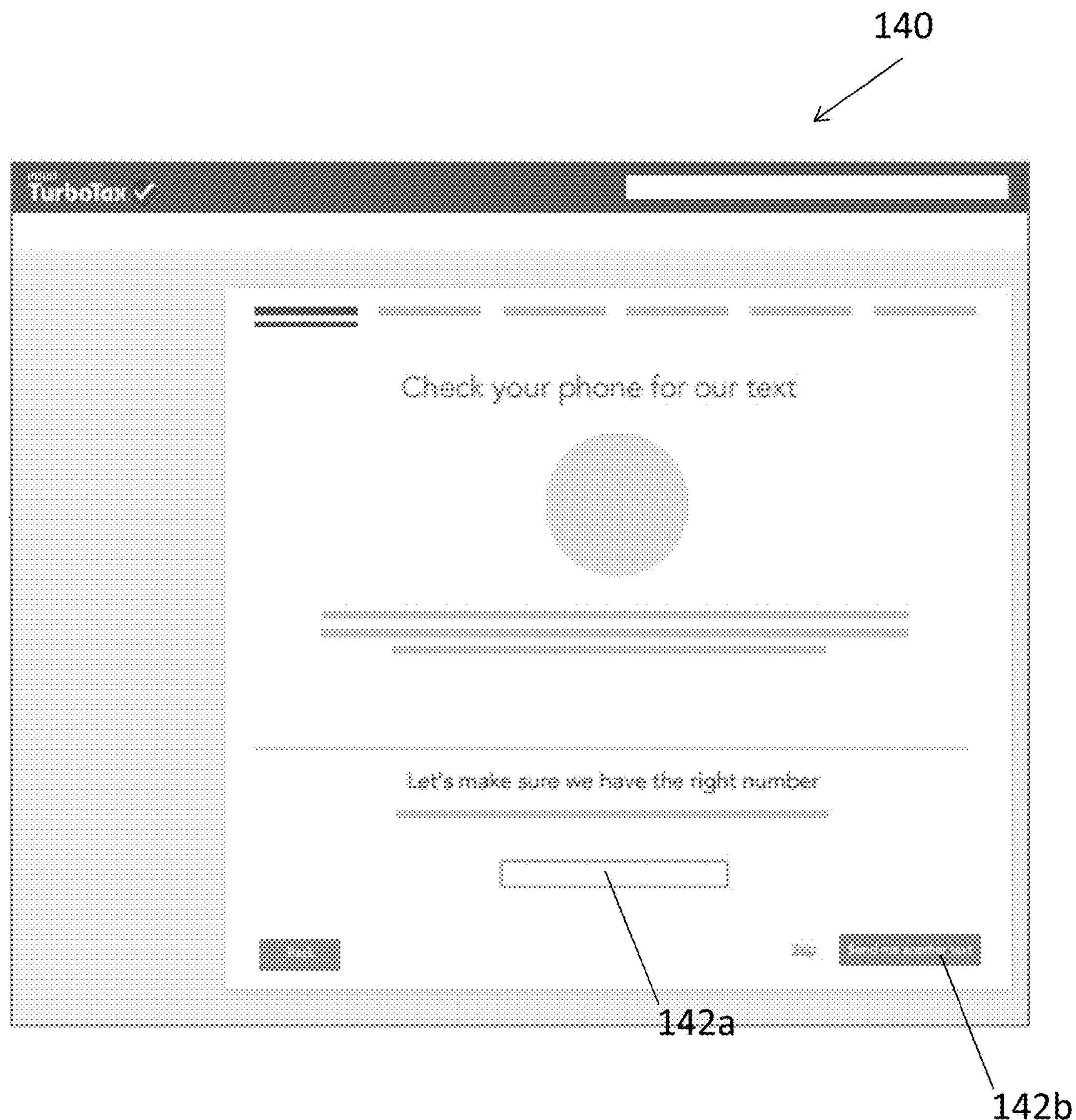

At step 326, the synchronized tax data acquisition system displays a message on the user interface 140 on the first computer 104 asking the user to re-enter the mobile phone number to connect the mobile phone 106 to the synchronized tax data acquisition system, as shown in FIG. 19. The user interface 140 includes a first user interface object 142*a* (e.g., a number entry box) configured to allow the user to re-enter the mobile phone number. The user interface 140 also includes a second user interface object 142*b* configured to allow the user to proceed to step 328. As with many other user interfaces 140 displayed during this method 300, this user interface 140 includes other user interface objects configured to cancel the picture taking process or go back a step in the method.

Figure 20:
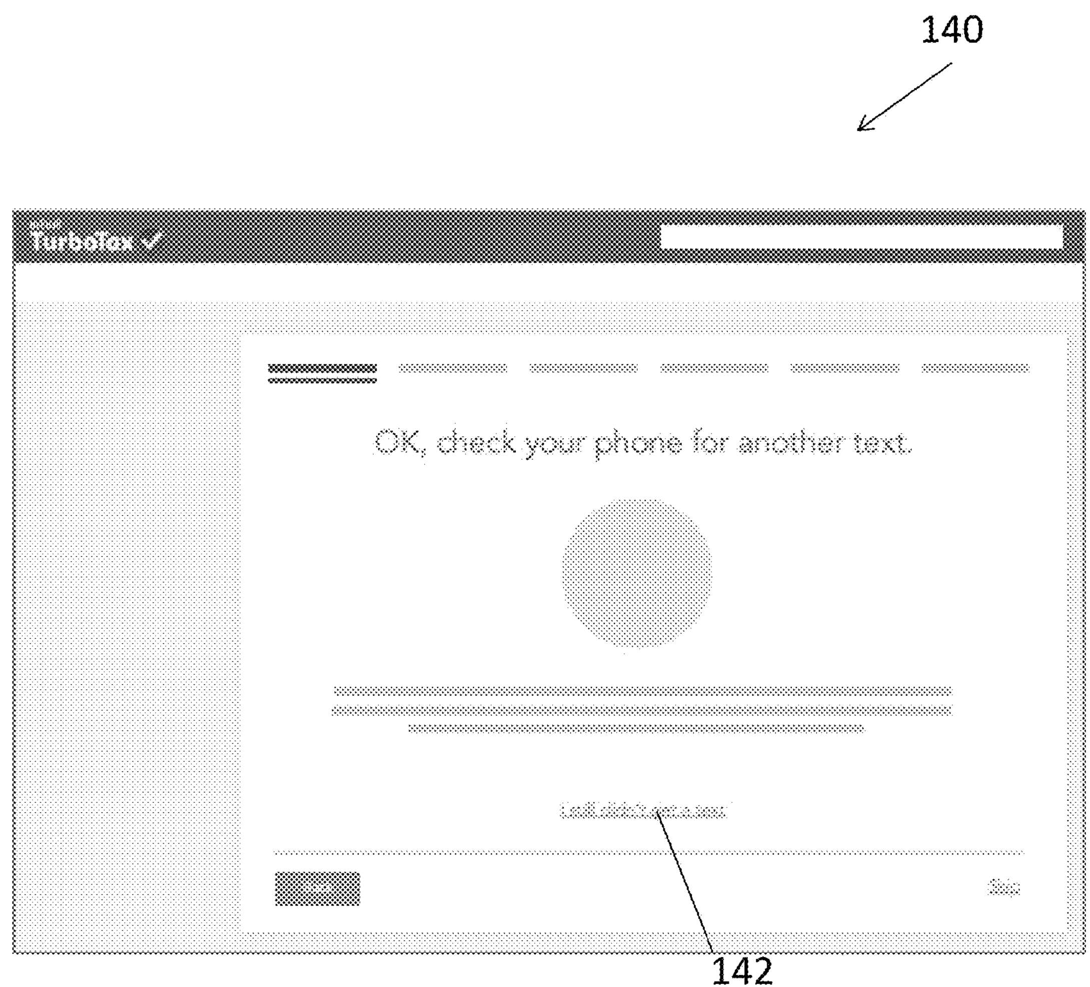

At step 328, the synchronized tax data acquisition system sends another SMS text message to the mobile phone number provided by the user at step 326. The SMS text message (shown in FIG. 27 and discussed below) includes a link to activate the mobile application 116 on the mobile phone 106. The synchronized tax data acquisition system also displays a message on the user interface 140 on the first computer 104 asking the user to "check your phone for another text," as shown in FIG. 20. The user interface 140 includes a user interface object 142 configured to allow the user to indicate that no SMS text message was received at the mobile phone 106.

At step 330, the synchronized tax data acquisition system determines whether the user received the SMS text message sent in step 328 (e.g., with input from the user using the user interface 140 in FIG. 18). If the user indicates receipt of the SMS text message (e.g., by interacting with the SMS text message on the mobile phone 106), the synchronized tax data acquisition system proceeds to step 324, which is placeholder for the method 400 for acquiring tax data from tax documents depicted in FIG. 26. If the user indicates that the SMS text message (the second SMS text message) was not received, the synchronized tax data acquisition system proceeds to step 332. Although the method 300 describes proceeding to step 332 after two SMS text messages are sent and not received, the number of SMS text messages can be modified to be higher or lower.

Figure 21:
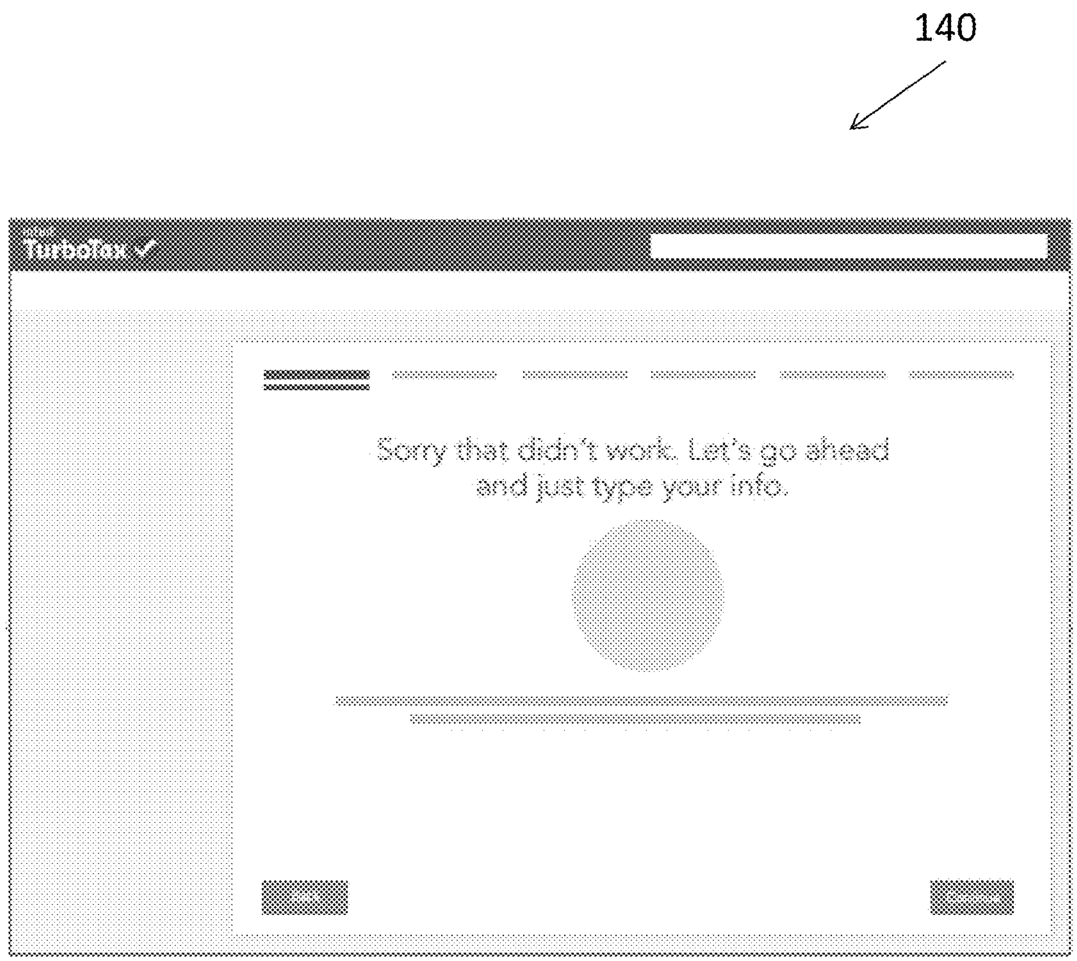

At step 332, the synchronized tax data acquisition system displays a message on the user interface 140 on the first computer 104 informing the user that the tax document image acquisition is not working and asking the user to proceed to typing the W-2 information, as shown in FIG. 21. The synchronized tax data acquisition system then proceeds to the end of the method at step 342.

Figure 26:
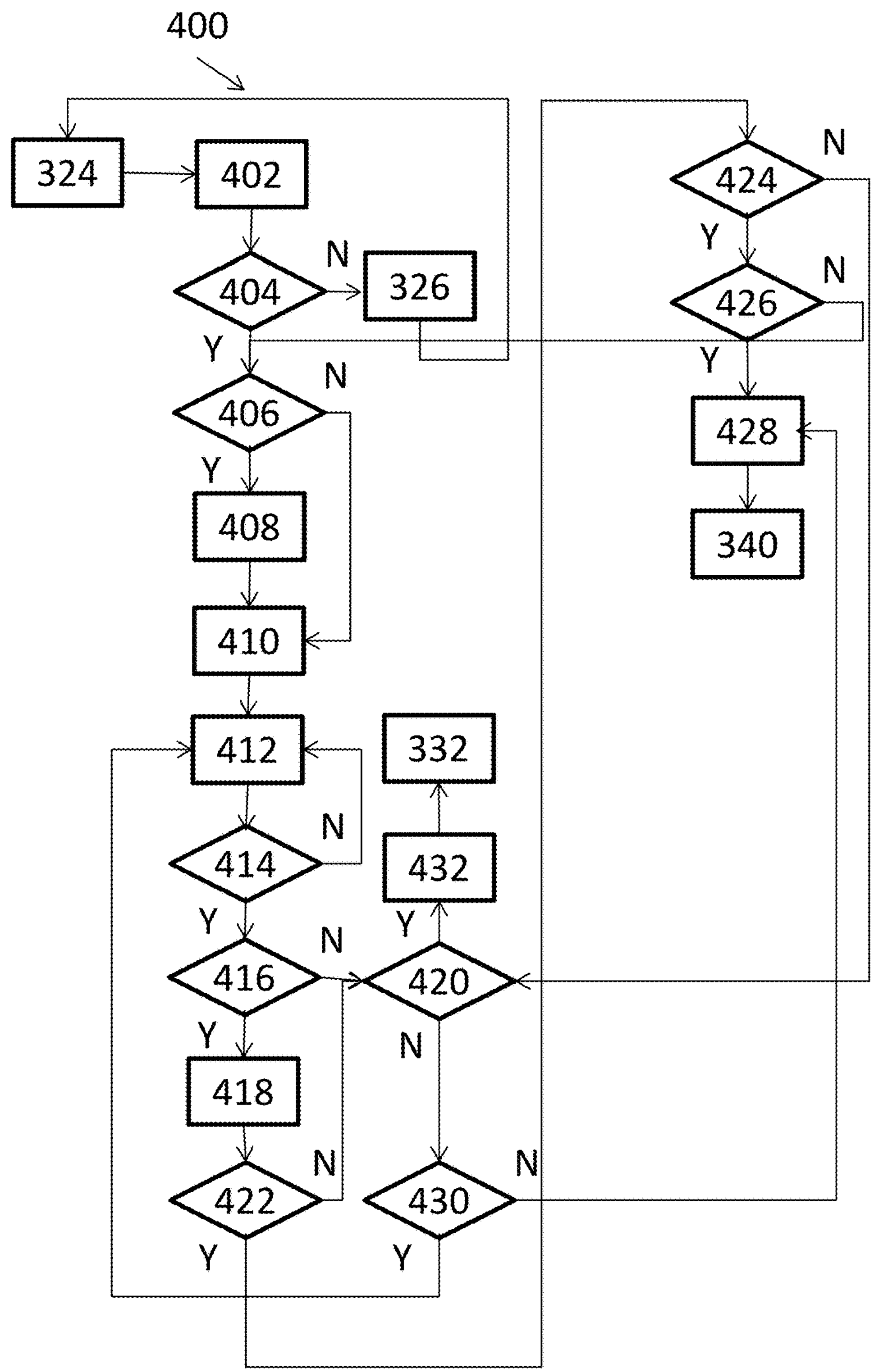

When the method 400 for acquiring tax data from tax documents depicted in FIG. 26 acquires an image of a tax document, the synchronized tax data acquisition system returns to the method 300 for acquiring tax data from tax documents depicted in FIG. 12 at step 334. At step 334, the synchronized tax data acquisition system determines whether the image (e.g., quality and OCR) was acceptable for data acquisition. If the image was acceptable, the synchronized tax data acquisition system proceeds to step 336. If the image was not acceptable, the synchronized tax data acquisition system proceeds to step 338.

Figure 22:
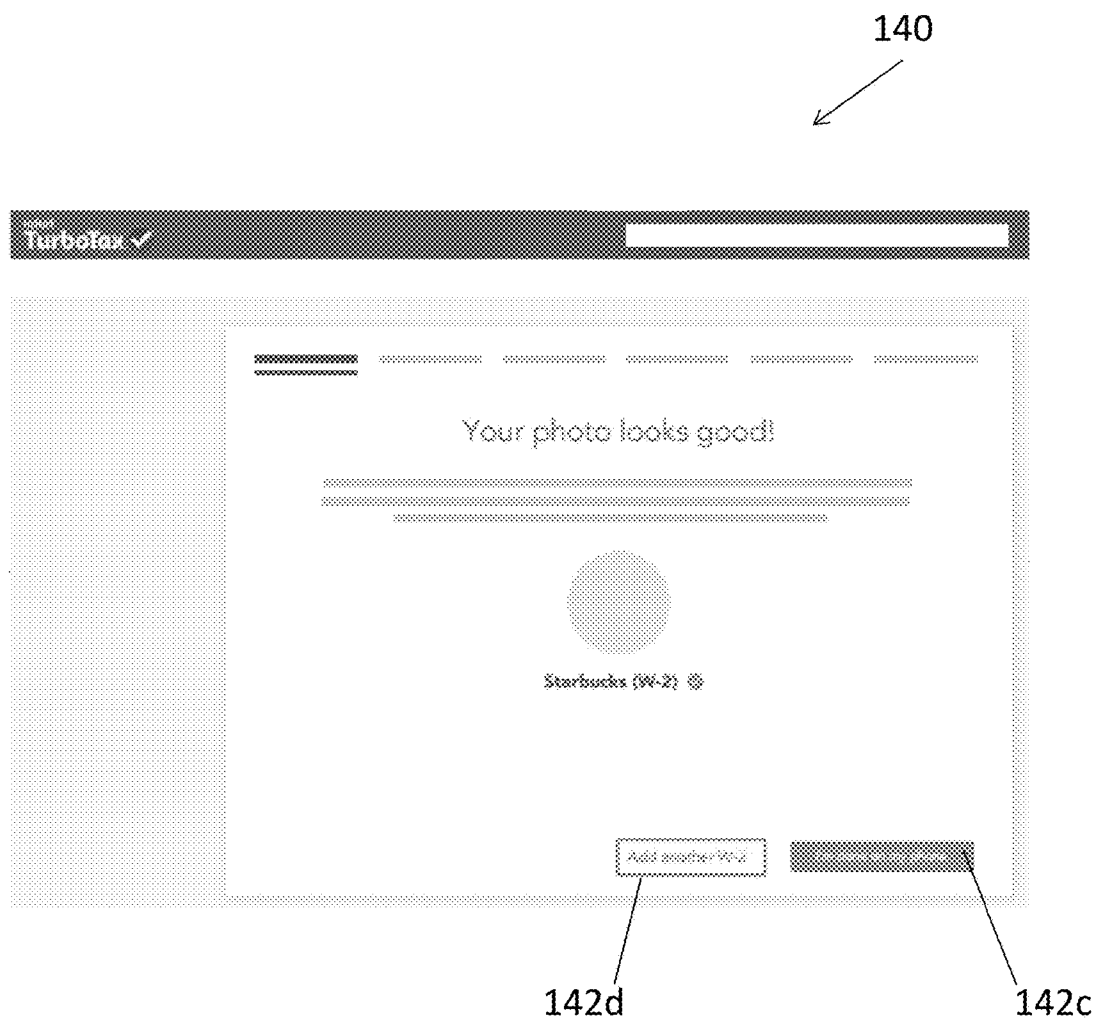
Figure 23:
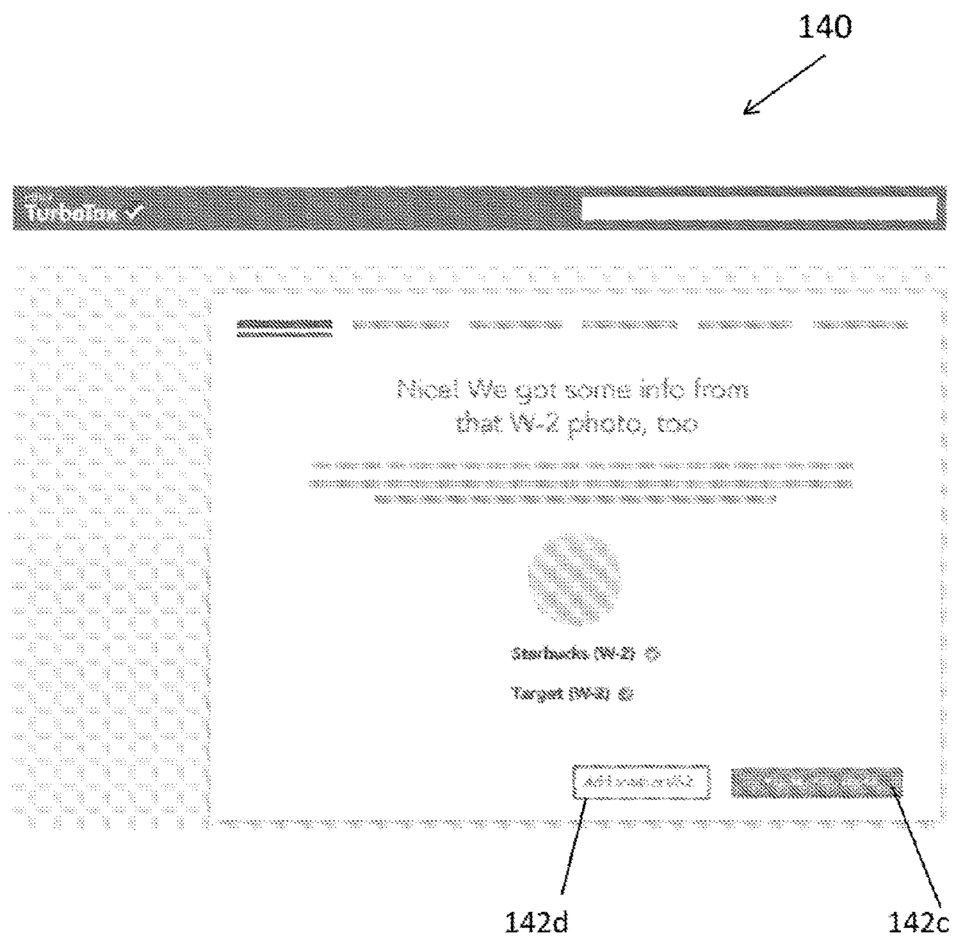

At step 336, the synchronized tax data acquisition system displays a message on the user interface 140 on the first computer 104 informing the user that the tax document image is acceptable, as shown in FIG. 22. The user interface 140 also determines whether the user is done acquiring tax document images. The user interface 140 includes a first user interface object 142*c* configured to allow the user to stop acquiring tax document images and proceed to step 340. The user interface 140 also includes a second user interface object 142*d* configured to allow the user to acquire tax data from another W-2 by proceeding to step 324. This second tax document image acquisition session may be associated with the previously generated unique session identifier or a new session identifier. When this second tax document image acquisition session is successfully completed, the synchronized tax data acquisition system displays a message on the user interface 140 on the first computer 104 informing the user that the second W-2 has also been added, as shown in FIG. 23. If the user selects the first user interface object 142*d*, the synchronized tax data acquisition system directs the user to go back to the mobile phone 106, which is synchronized to capture another image.

At step 338, the synchronized tax data acquisition system determines whether it has experienced a third image acquisition failure. For instance, the image quality module 136 can include a counter to determine the number of failures. If the synchronized tax data acquisition system determines that it has experienced a third failure, it proceeds to step 332 and displays the user interface 140 in FIG. 21. If the synchronized tax data acquisition system determines that it has not experienced a third failure, it proceeds to step 324 and tries to acquire the tax document image again. This second attempt may be associated with the previously generated unique session identifier or a new session identifier.

Figure 24:
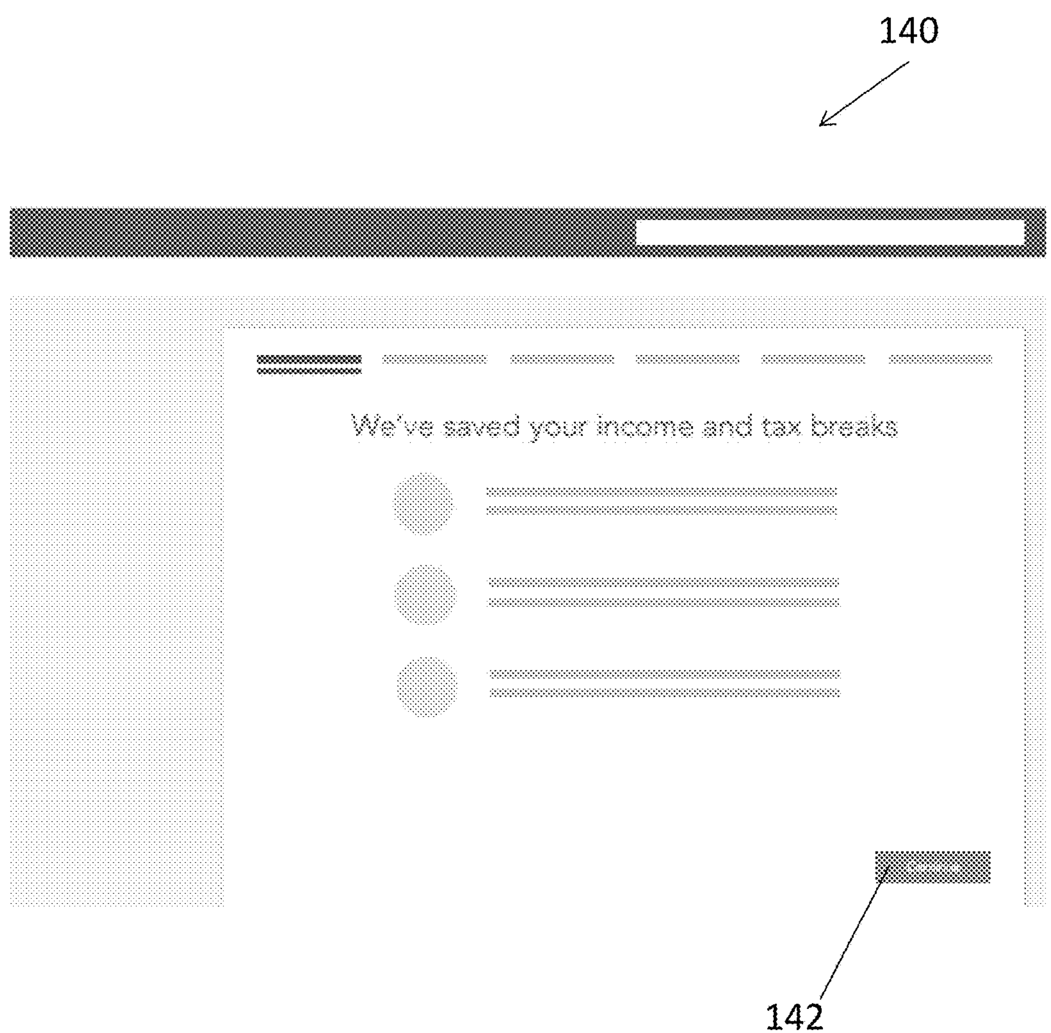

At step 340, the synchronized tax data acquisition system the synchronized tax data acquisition system displays a message (i.e., a summary page) on the user interface 140, as shown in FIG. 24. The summary page informs the user that tax data from the one or more W-2's has been saved in the electronic tax return preparation program 110, and summarizes that information for the user's review. The summary page includes an identification of a tax document from which the tax information was acquired. The summary page can be displayed on both of the first and second computers 104, 106. The user interface 140 includes a user interface object 142 configured to allow the user to proceed to the end of the method at step 342, when the user has completed review of the summary page.

FIG. 26 depicts a computer-implemented method 400 for acquiring tax data from tax documents executed according to one embodiment by a synchronized tax data acquisition system running on a hardware system 100, as shown in FIGS. 1 to 10 for example. The synchronized tax data acquisition system can include an electronic tax return preparation program 110 and a synchronized tax data acquisition program 112, both running on a server computer 102. The synchronized tax data acquisition system can also include a browser 114 running on a first computer 104, and configured to access the electronic tax return preparation program 110 and the synchronized tax data acquisition program 112. The synchronized tax data acquisition system can further include a mobile application 116 running on a second computer 106. The electronic tax return preparation program 110, the synchronized tax data acquisition program 112, the browser 114 and the mobile application 116 can be operatively coupled by at least one network 108. Method 400 runs on the second computer 106 and the server 102. Method 400 is operatively coupled to method 300 depicted in FIG. 12, which runs on the first computer 104 and the server 102. During the entire method 400, the state tracker 134 receives and stores the respective states of first and second computers 104, 106 to synchronize these states at each step, as depicted in FIGS. 38 and 39 and described below.

Figure 27:
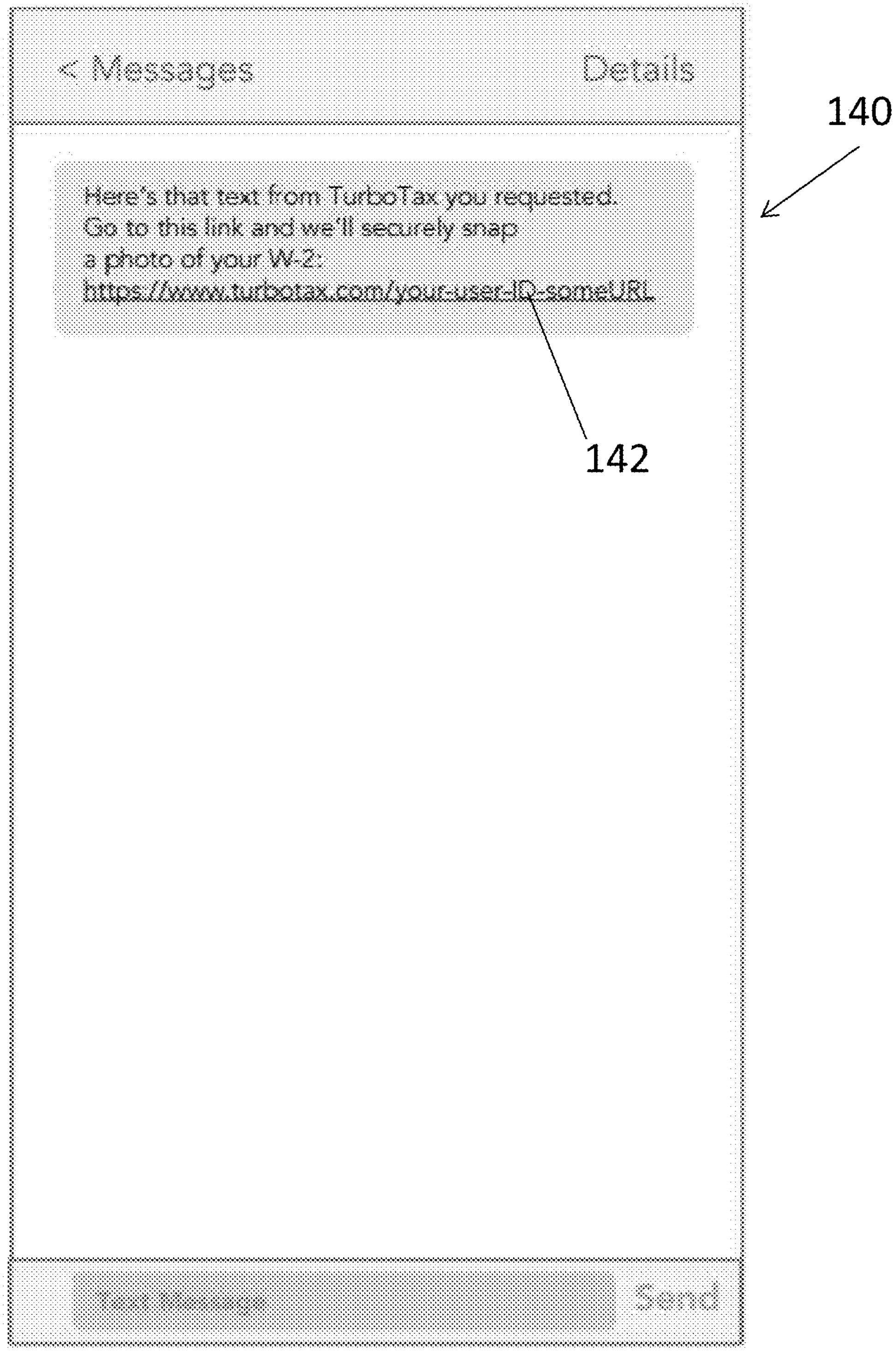

At step 402, the synchronized tax data acquisition system proceeds from processes related to the first (e.g., desktop) computer 104 (method 300, FIG. 12) to processes related to the second (e.g., mobile phone) computer 106 (method 400, FIG. 26), which is indicated by step 324 in method 300. The synchronized tax data acquisition system displays an SMS text message on a user interface 140 on a second computer 106 (e.g., a mobile phone) asking the user to securely acquire an image of a tax document, as shown in FIG. 27. The user interface 140 may be part of a text application running on a second computer 106 of the user. The user interface 140 includes a user interface object 142 (e.g., a hyperlink) configured to allow the user instantiate a mobile application 116 to connect the first and second computers 104, 106.

Figure 25:
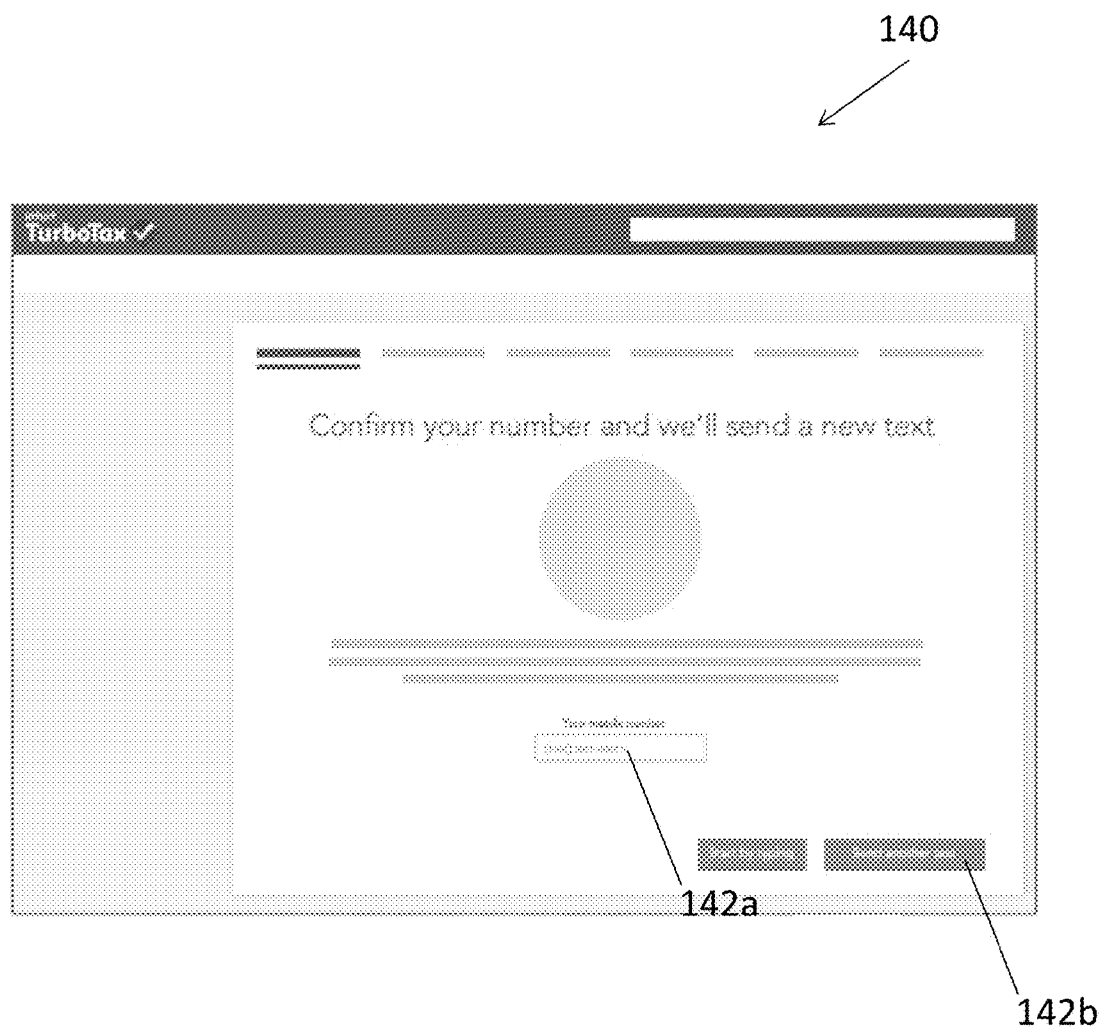

At step 404, the synchronized tax data acquisition system determines whether the link (i.e., user interface object 142) received in step 402 is valid. For instance, a link can be invalid if it has expired. If the synchronized tax data acquisition system determines that the link is valid, the synchronized tax data acquisition system proceeds to step 406. If the synchronized tax data acquisition system determines that the link is not valid, the synchronized tax data acquisition system returns to step 326 of method 300 depicted in FIG. 12 to attempt to send a new SMS text message. When the synchronized tax data acquisition system arrives at step 326 from step 404, the user interface 140 displayed at step 326 is the one shown in FIG. 25. From step 326, the synchronized tax data acquisition system returns to step 324. Although the method 400 describes proceeding to step 326 from step 404, the synchronized tax data acquisition system may include a "third failure" exit to END similar to the one in step 338 of method 300.

At step 406, the synchronized tax data acquisition system determines whether the W-2 must be assigned to a particular taxpayer, as in step 306. The synchronized tax data acquisition system can make this determination automatically (e.g., by importing the information obtained in step 306 of method 300). The synchronized tax data acquisition system can also make this determination by seeking user input through the user interface (not shown). If the synchronized tax data acquisition system determines that the W-2 must be assigned to a particular taxpayer, the synchronized tax data acquisition system proceeds to step 408. Otherwise, the synchronized tax data acquisition system proceeds to step 410, bypassing step 408.

Figure 28:
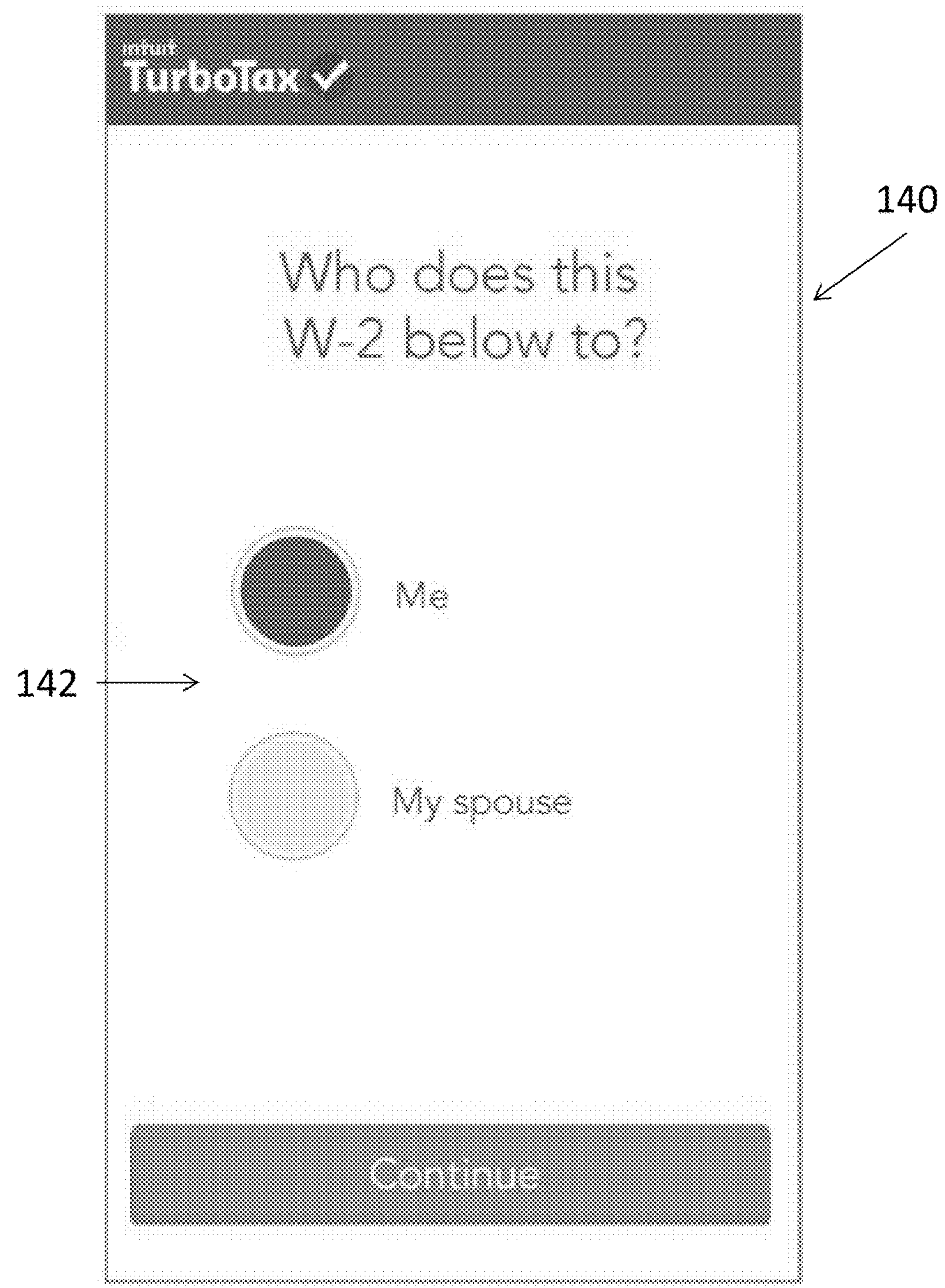

At step 408, the synchronized tax data acquisition system displays a message on the user interface 140 on the mobile phone 106 asking the user to assign the W-2, as shown in FIG. 28. The user interface 140 includes two user interface objects 142 configured to allow the user to assign the W-2 to the taxpayer or their spouse. In other embodiments, the synchronized tax data acquisition system may display a message and user interface objects 142 configured to allow the user to assign the W-2 to other taxpayers as appropriate. At step 408, the synchronized tax data acquisition system automatically advances the state of the browser 114 running on first computer 104 to step 308 (FIG. 15).

Figure 29:
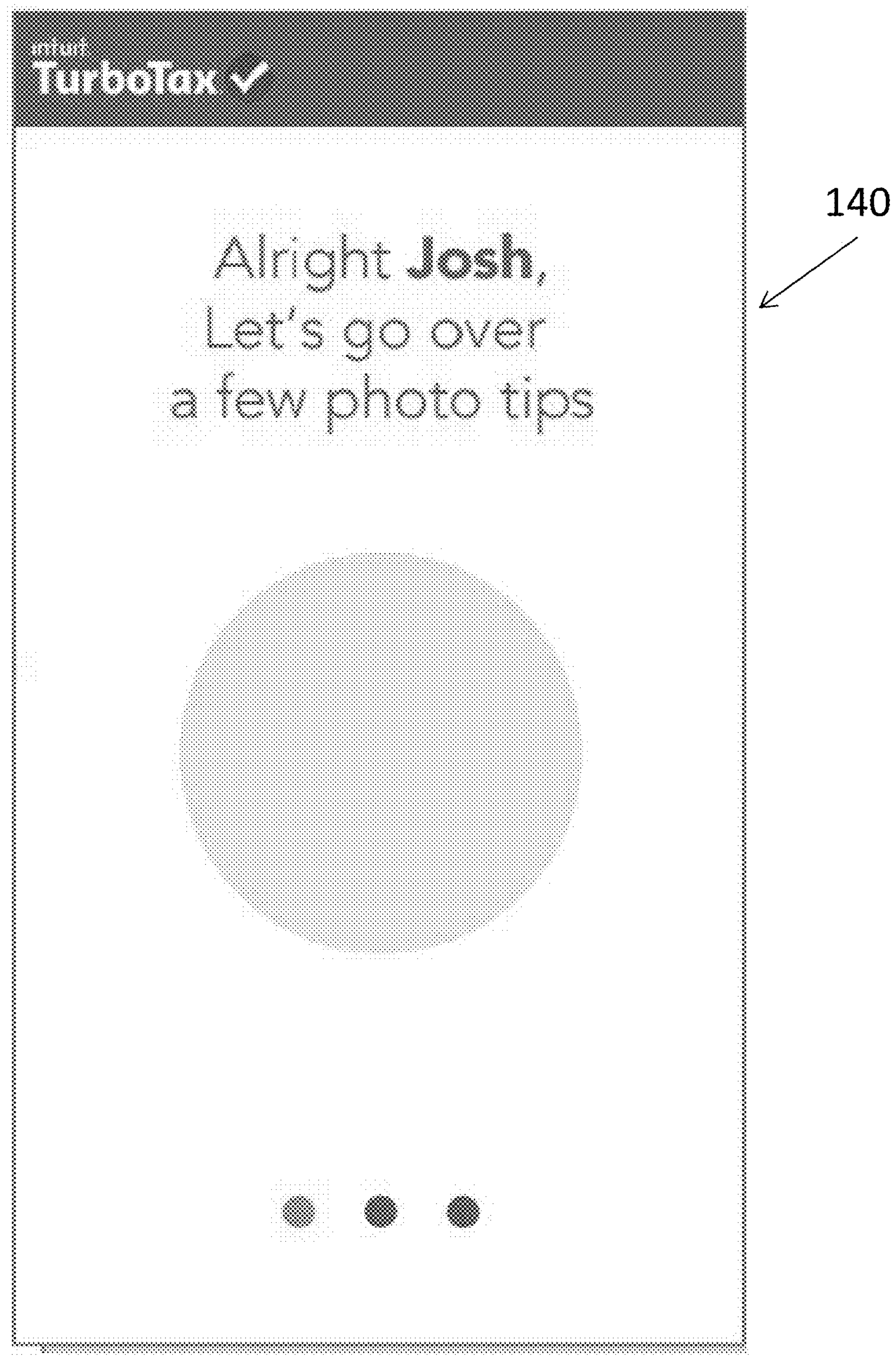

At step 410, the synchronized tax data acquisition system displays a message on the user interface 140 on the mobile phone 106 including photo tips to help the user acquire an acceptable image of the tax document, as shown in FIG. 29. These tips may include positioning, lighting and steadiness. At step 410, the synchronized tax data acquisition system automatically advances the state of the browser 114 running on first computer 104 such that it displays a user interface (not shown) indicating that the mobile phone 106 is acquiring the tax document image.

Figure 30:
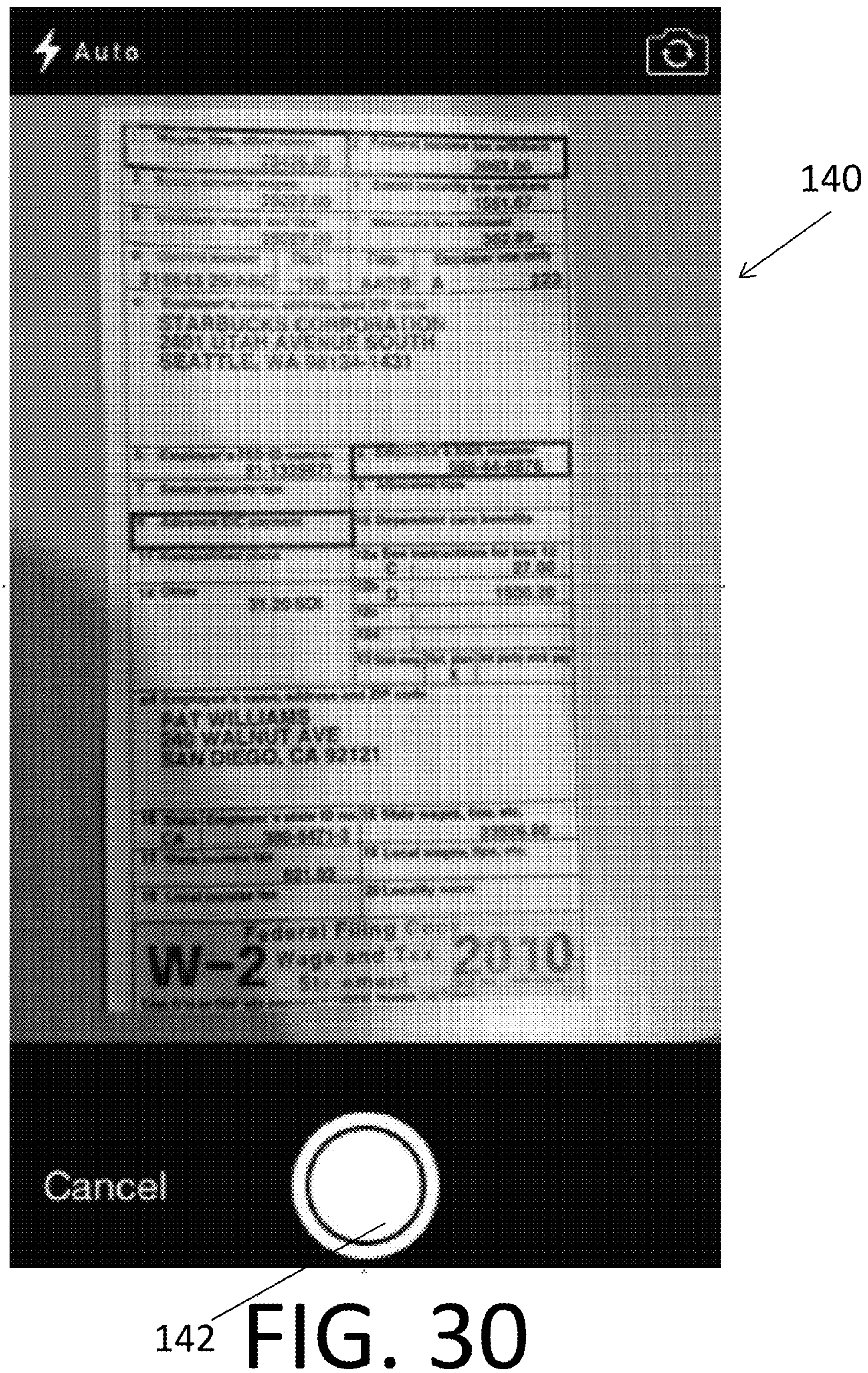

At step 412, the synchronized tax data acquisition system displays a user interface 140 on the mobile phone 106 configured to control the image acquisition device 118 on the mobile phone 106, as shown in FIG. 30. The user interface 140 includes a user interface object 142 configured to allow the user to take a picture of a tax document using the image acquisition device 118 on the mobile phone 106. At step 412, the synchronized tax data acquisition system maintains the state of the browser 114 running on first computer 104 such that it displays the user interface (not shown) indicating that the mobile phone 106 is acquiring the tax document image.

Figure 31:
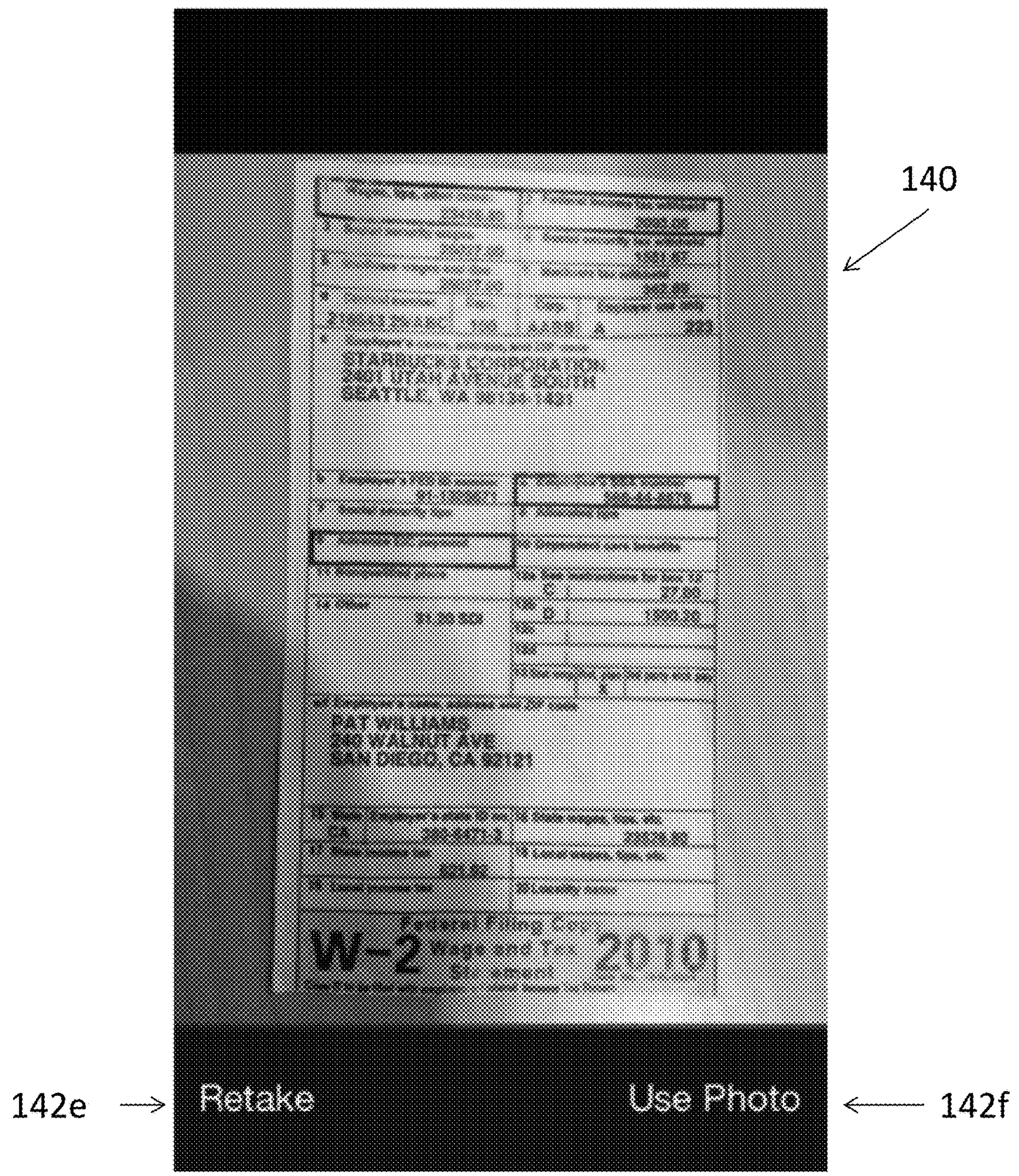

At step 414, the synchronized tax data acquisition system displays a user interface 140 on the mobile phone 106 configured to allow the user to choose whether to use the image captured at step 412, as shown in FIG. 31. The user interface 140 includes a first user interface object **142*f* configured to allow the user to proceed to step 416 with the captured image. The user interface 140 also includes a second user interface object 142*g* configured to allow the user to take another image of the tax document by returning to step 412. At step 414, the synchronized tax data acquisition system maintains the state of the browser 114 running on first computer 104 such that it displays the user interface (not shown) indicating that the mobile phone 106** is acquiring the tax document image.

At step 416, the synchronized tax data acquisition system determines whether the tax document image has acceptable brightness. The synchronized tax data acquisition system can make this determination automatically by having the image quality module 136 of the tax data extraction module 130 analyze the captured image. If the tax document image has acceptable brightness, the synchronized tax data acquisition system proceeds to step 418. If the tax document image does not have acceptable brightness, the synchronized tax data acquisition system proceeds to step 420, bypassing step 418. At step 416, the synchronized tax data acquisition system maintains the state of the browser 114 running on first computer 104 such that it displays the user interface (not shown) indicating that the mobile phone 106 is acquiring the tax document image.

Figure 32:
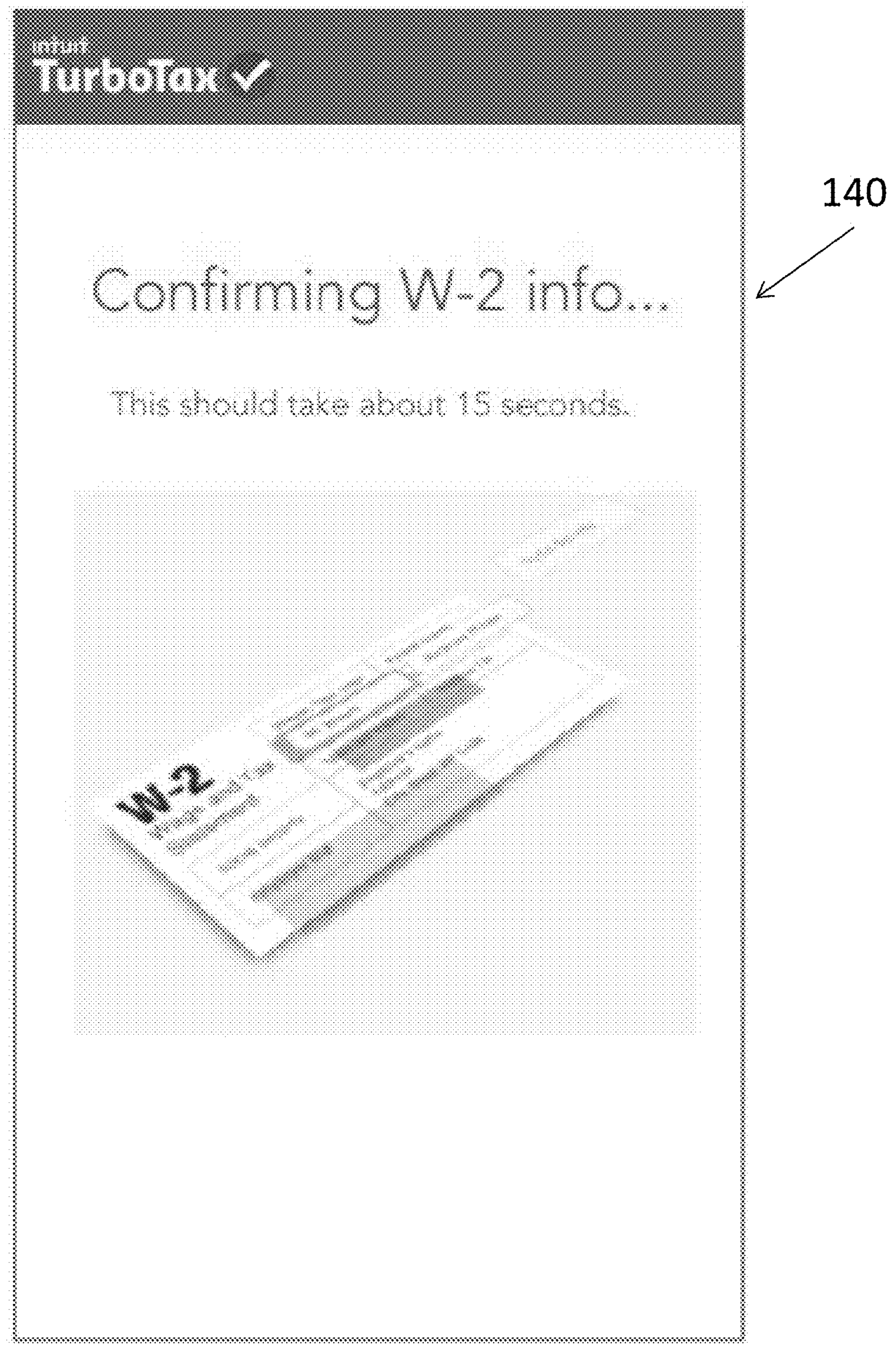

At step 418, the synchronized tax data acquisition system displays a user interface 140 on the mobile phone 106 configured to inform the user that the synchronized tax data acquisition system is confirming W-2 information (i.e., checking image and OCR quality), as shown in FIG. 32. At step 418, the synchronized tax data acquisition system maintains the state of the browser 114 running on first computer 104 such that it displays the user interface (not shown) indicating that the mobile phone 106 is acquiring the tax document image.

At step 420, the synchronized tax data acquisition system determines whether it has experienced a third image acquisition failure. For instance, the image quality module 136 can include a counter to determine the number of failures. If the synchronized tax data acquisition system determines that it has experienced a third failure, it proceeds to step 432 and displays the user interface 140 in FIG. 37. From step 432, the synchronized tax data acquisition system proceeds to step 332 ("not working, let's type) of method 300. If the synchronized tax data acquisition system determines that it has not experienced a third failure, it proceeds to step 430, and tries to acquire the tax document image again. This second attempt may be associated with the previously generated unique session identifier or a new session identifier. If synchronized tax data acquisition system determines that it has not experienced a third failure, it maintains the state of the browser 114 running on first computer 104 such that it displays the user interface (not shown) indicating that the mobile phone 106 is acquiring the tax document image.

At steps 422 and 424, the synchronized tax data acquisition system determines whether the tax document image has been uploaded successfully and has acceptable OCR, respectively. The synchronized tax data acquisition system can make these determinations automatically by having the image quality module 136 of the tax data extraction module 130 analyze the uploaded and OCR'ed images, respectively. If the tax document image has been uploaded successfully (step 422), the synchronized tax data acquisition system proceeds to step 424. If the tax document image has acceptable OCR (step 424), the synchronized tax data acquisition system proceeds to step 426. If the tax document image has not been successfully uploaded at step 422, the synchronized tax data acquisition system proceeds to step 430, and tries to acquire the tax document image again. If the tax document image does not have acceptable OCR at step 424, the synchronized tax data acquisition system proceeds to the third failure analysis in step 420, which is described above. At steps 422 and 424, the synchronized tax data acquisition system maintains the state of the browser 114 running on first computer 104 such that it displays the user interface (not shown) indicating that the mobile phone 106 is acquiring the tax document image.

Figure 33:
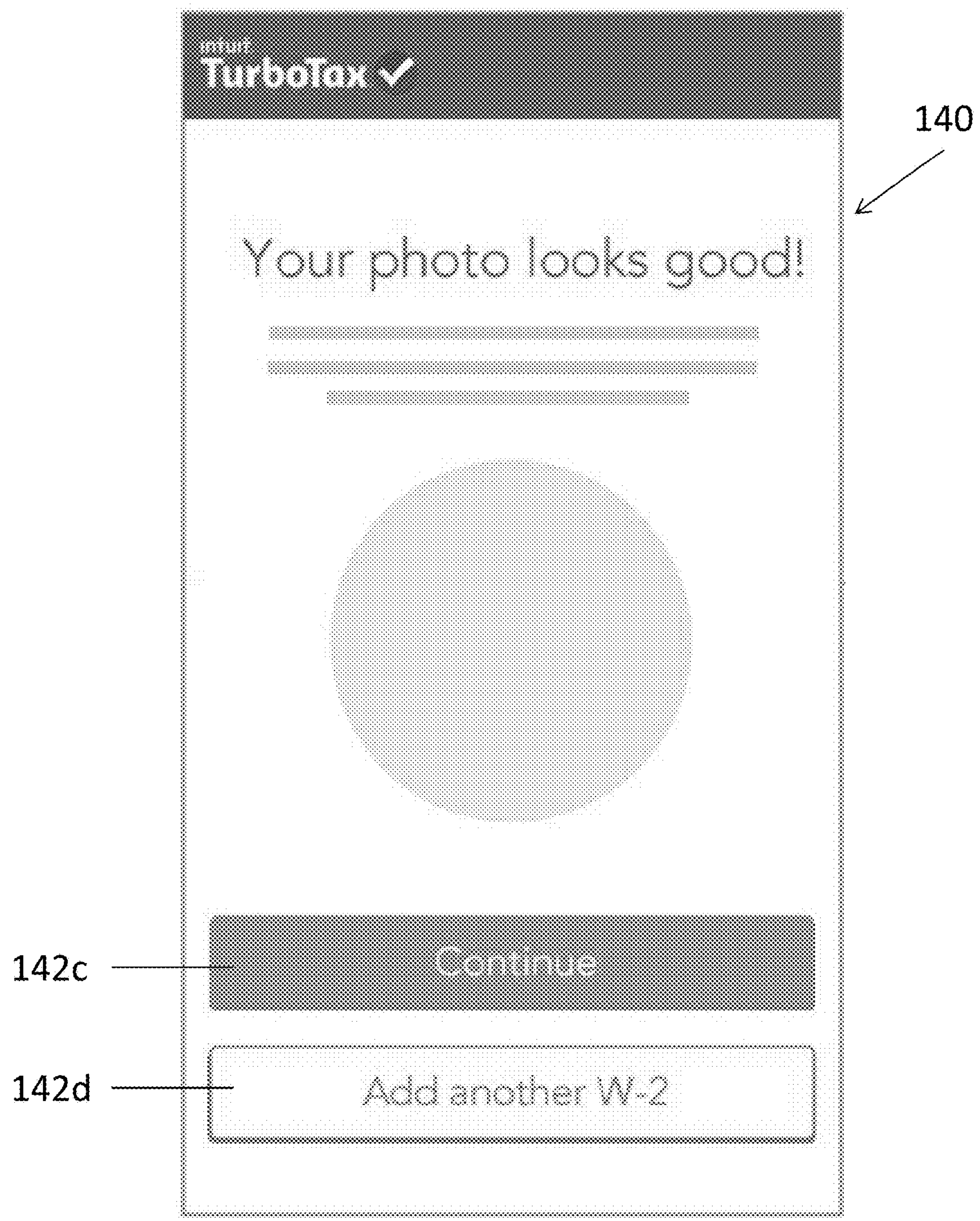

At step 426, the synchronized tax data acquisition system displays a user interface 140 on the mobile phone 106 configured to inform the user that the tax document image is acceptable, as shown in FIG. 33. The user interface 140 includes a first user interface object 142*c* configured to allow the user to stop acquiring tax document images and proceed to step 428. The user interface 140 also includes a second user interface object 142*d* configured to allow the user to acquire tax data from another W-2. If the user selects the first user interface object 142*d*, the synchronized tax data acquisition system returns to step 406, which is described above. This second tax document image acquisition session may be associated with the previously generated unique session identifier or a new session identifier. At step 426, the synchronized tax data acquisition system maintains the state of the browser 114 running on first computer 104 such that it displays the user interface (not shown) indicating that the mobile phone 106 is acquiring the tax document image.

Figure 34:
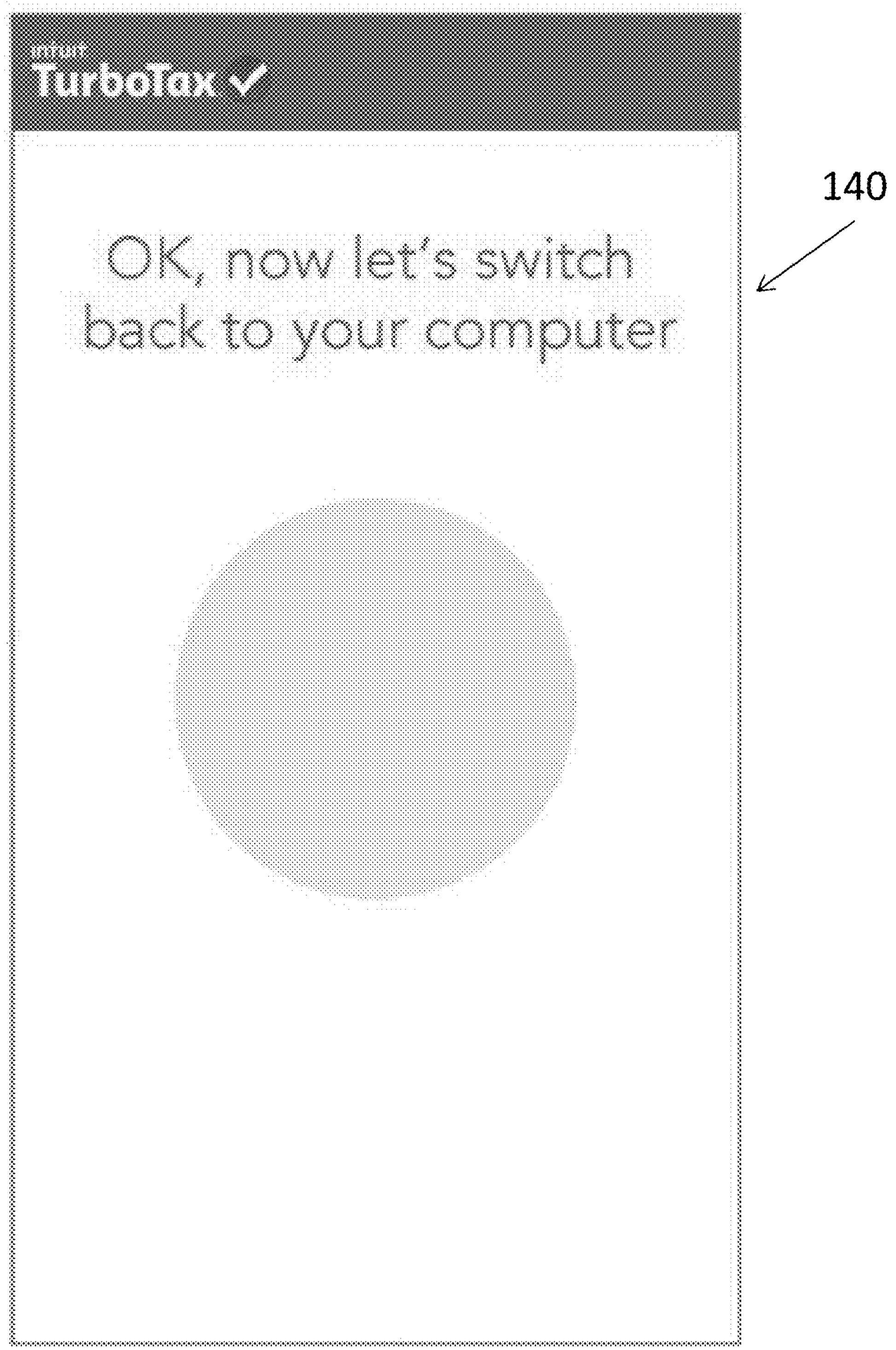

At step 428, the synchronized tax data acquisition system displays a user interface 140 on the mobile phone 106 configured to inform the user that the synchronized tax data acquisition system will switch back to the first computer 104 (i.e., desktop), as shown in FIG. 34. At step 428, the synchronized tax data acquisition system automatically advances the state of the browser 114 running on first computer 104 to step 340 (summary page, on FIG. 24).

Figure 35:
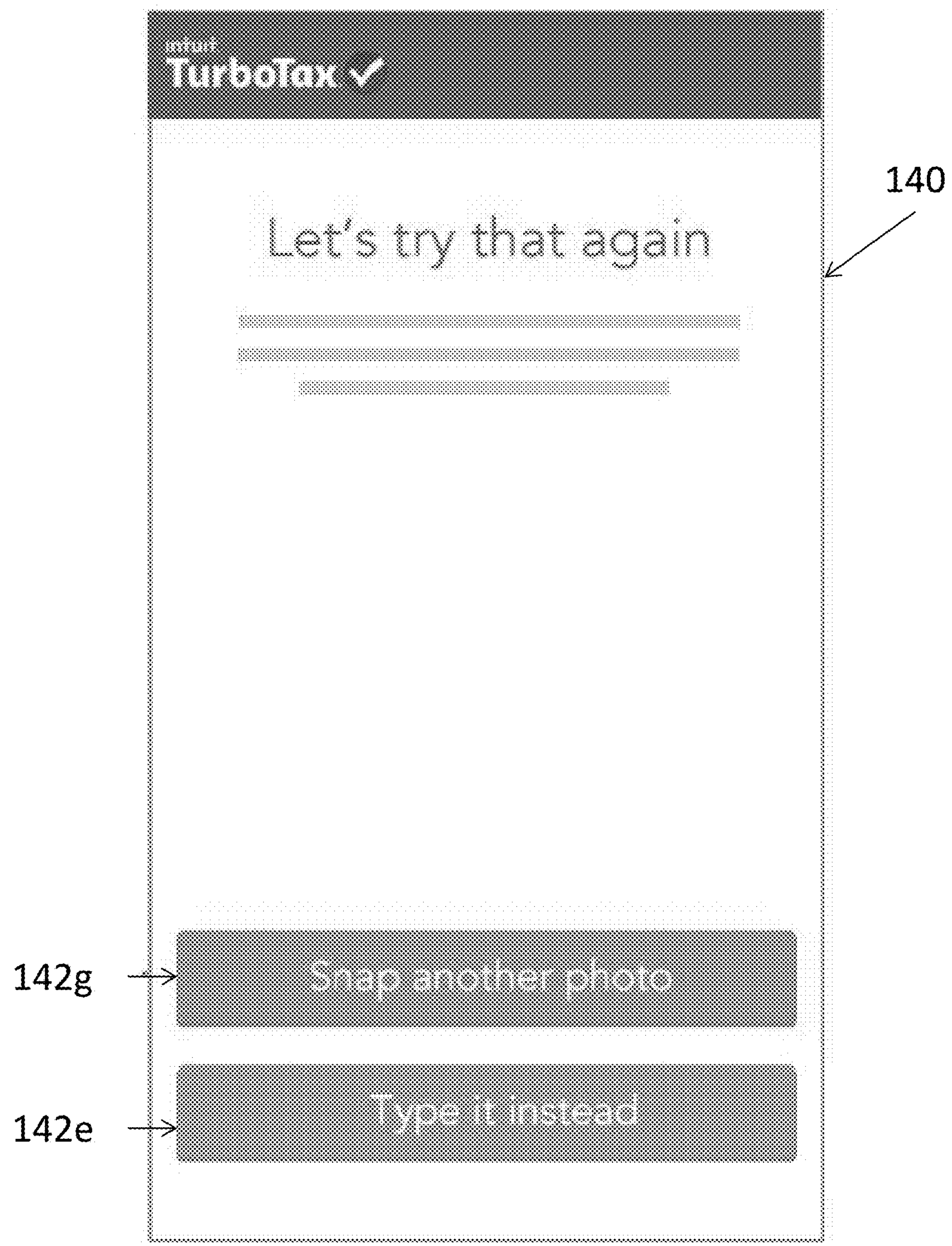
Figure 36:
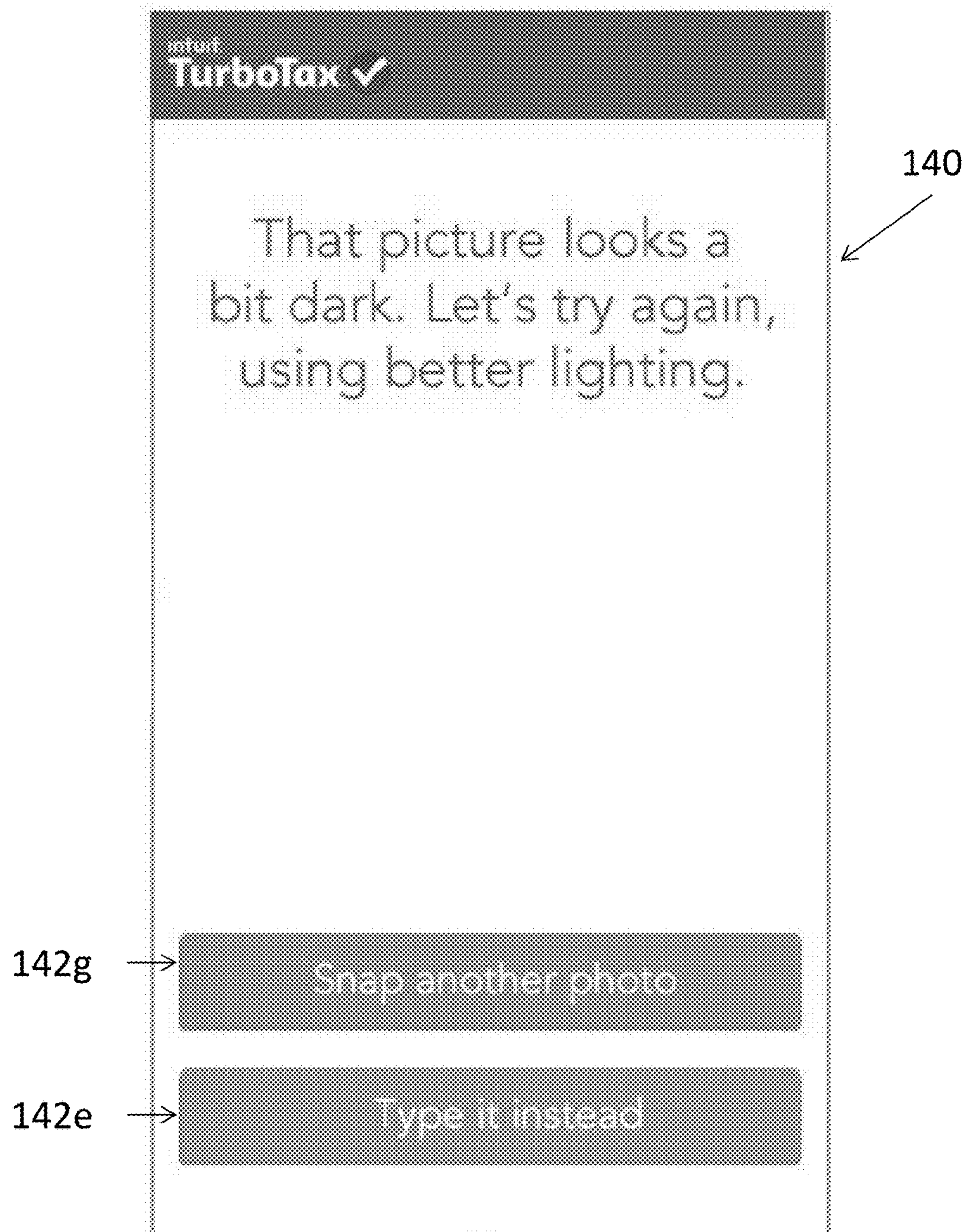

At step 430, the synchronized tax data acquisition system displays a user interface 140 on the mobile phone 106 configured to inform the user that the synchronized tax data acquisition system should acquire another image of the W-2, as shown in FIGS. 35 and 36. The messaging is the only difference between FIGS. 35 and 36. The messaging can be tailored to conform to the failure that resulted in the synchronized tax data acquisition system arriving at step 430. The user interface 140 includes a first user interface object 142*g* configured to allow the user to take another image of the tax document by returning to step 412. The user interface 140 also includes a second user interface object 142*e* configured to allow the user to switch back to the first computer 104 by going to step 428. If the user selects the first user interface object 142*g*, the synchronized tax data acquisition system maintains the state of the browser 114 running on first computer 104 such that it displays the user interface (not shown) indicating that the mobile phone 106 is acquiring the tax document image. If the user selects the second user interface object 142*e*, the synchronized tax data acquisition system will end up at step 340.

Figure 37:
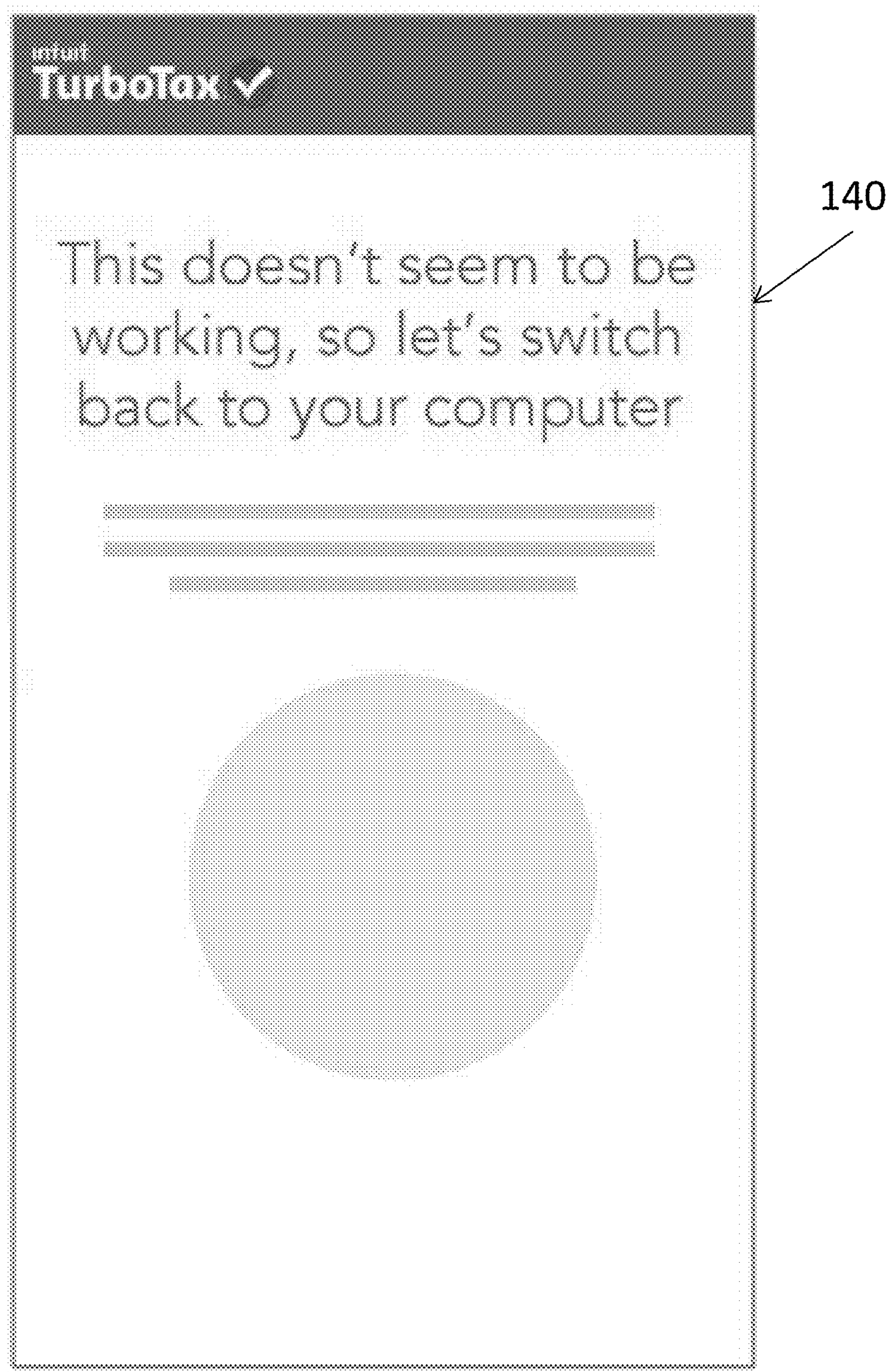

At step 432, the synchronized tax data acquisition system displays a user interface 140 on the mobile phone 106 configured to inform the user that the tax document image acquisition is not working, and that synchronized tax data acquisition system should switch back to the first computer 104 (i.e., desktop), as shown in FIG. 37. At step 432, the synchronized tax data acquisition system automatically advances the state of the browser 114 running on first computer 104 to step 332 (didn't work, let's type, on FIG. 21).

FIG. 38 depicts a computer-implemented method 500 for synchronizing a mobile application 116 and an electronic tax return preparation program 110, while acquiring tax data from tax documents, executed according to one embodiment by a synchronized tax data acquisition system running on a hardware system 100, as shown in FIGS. 1 to 10 for example. The synchronized tax data acquisition system can include an electronic tax return preparation program 110 and a synchronized tax data acquisition program 112, both running on a server computer 102. The synchronized tax data acquisition system can also include a browser 114 running on a first computer 104, and configured to access the electronic tax return preparation program 110 and the synchronized tax data acquisition program 112. The synchronized tax data acquisition system can further include a mobile application 116 running on a second computer 106. The electronic tax return preparation program 110, the synchronized tax data acquisition program 112, the browser 114 and the mobile application 116 can be operatively coupled by at least one network 108. Method 500 runs on the server 102, more particularly, the state tracker 134 of the server 102. Method 500 is operatively coupled to methods 300 and 400 depicted in FIGS. 12 and 26, respectively.

At step 502, the synchronized tax data acquisition system receives a change in a state of the mobile application 116. The synchronized tax data acquisition system can receive this state change because the mobile application 116 is configured to update the state tracker 134 every time it changes state. Alternatively, the state tracker 134 can be configured to monitor the state of the mobile application 116 at pre-determined time intervals.

At step 504, the synchronized tax data acquisition system determines a corresponding state for the electronic tax return preparation program 110 based on the received state change of the mobile application 116. The state tracker 134 may utilize a look up table to determine the corresponding state for the electronic tax return preparation program 110.

At step 506, the synchronized tax data acquisition system generates a state change request conforming to the corresponding state for the electronic tax return preparation program 110, as determined in step 504. The state change request is sent to the electronic tax return preparation program 110 in step 508.

While the previous embodiments (e.g., FIGS. 12, 26 and 38) describe synchronizing a state of the electronic tax return preparation program 110 based on a state change in the mobile application 116, the state of the mobile application 116 can also be synchronized based on a state change in the electronic tax return preparation program 110. For instance, FIG. 39 depicts a computer-implemented method 600 for synchronizing an electronic tax return preparation program 110 and a mobile application 116, while acquiring tax data from tax documents, executed according to one embodiment by a synchronized tax data acquisition system running on a hardware system 100, as shown in FIGS. 1 to 10 for example. The synchronized tax data acquisition system can include an electronic tax return preparation program 110 and a synchronized tax data acquisition program 112, both running on a server computer 102. The synchronized tax data acquisition system can also include a browser 114 running on a first computer 104, and configured to access the electronic tax return preparation program 110 and the synchronized tax data acquisition program 112. The synchronized tax data acquisition system can further include a mobile application 116 running on a second computer 106. The electronic tax return preparation program 110, the synchronized tax data acquisition program 112, the browser 114 and the mobile application 116 can be operatively coupled by at least one network 108. Method 600 runs on the server 102, more particularly, the state tracker 134 of the server 102. Method 600 is operatively coupled to methods 300 and 400 depicted in FIGS. 12 and 26, respectively.

At step 602, the synchronized tax data acquisition system receives a change in a state of the electronic tax return preparation program 110. The synchronized tax data acquisition system can receive this state change because the electronic tax return preparation program 110 is configured to update the state tracker 134 every time it changes state. Alternatively, the state tracker 134 can be configured to monitor the state of the electronic tax return preparation program 110 at pre-determined time intervals.

At step 604, the synchronized tax data acquisition system determines a corresponding state for the mobile application 116 based on the received state change of the electronic tax return preparation program 110. The state tracker 134 may utilize a look up table to determine the corresponding state for the mobile application 116.

At step 606, the synchronized tax data acquisition system generates a state change request conforming to the corresponding state for the mobile application 116, as determined in step 604. The state change request is sent to the mobile application 116 in step 608.

The methods 300, 400, 500, 600, 700 depicted in FIGS. 12, 26, 38 and 39 involve interactions between a synchronized tax data acquisition program 112, an electronic tax return preparation program 110 and a mobile application 116. The networked communications between these programs occur in real-time, such that the user's experience has no noticeable time lag in switching between the electronic tax return preparation program 110 and the mobile application 116.

While FIGS. 12-37 depict embodiments for acquiring tax data from W-2 documents, the described methods are not so limited. Further, while embodiments have been described for acquiring tax data for use by tax return preparation programs, other embodiments include systems and methods for collecting data from documents using two computers in general. For instance, embodiments include systems and methods for collecting data from documents for financial programs including bill payment programs (such as online banking programs) and financial management systems (such as MINT or QUICKEN financial management systems).

Such systems and methods would have similar construction and function as the systems and methods for acquiring tax data described above. For instance, such financial data acquisition systems may include the following elements: a synchronized financial data acquisition system (analogous to the synchronized tax data acquisition system); a financial data source document (analogous to the tax data document); a network 108; a server 102; a first computer 104; a second computer 106; a synchronized financial data acquisition program (analogous to the synchronized tax data acquisition program 112; a financial data source program (analogous to the tax data source program 116); a browser 114; and a mobile application 116.

Further, sources of tax documents include, but are not limited to, documents from government databases, such as property tax records, Department of Motor Vehicle (DMV) records and US Census data) and other external sources. MINT and QUICKEN are registered trademarks of Intuit Inc., Mountain View, Calif.

Where methods and steps described above indicate certain events occurring in certain order, those of ordinary skill in the art having the benefit of this disclosure would recognize that the ordering of certain steps may be modified and that such modifications are in accordance with the variations of the disclosed embodiments. Additionally, certain of the steps may be performed concurrently in a parallel process as well as performed sequentially. Thus, the methods shown in various flow diagrams are not intended to be limited to a particular sequential order, unless otherwise stated or required.

Accordingly, embodiments are intended to exemplify alternatives, modifications, and equivalents that may fall within the scope of the claims.

What is claimed is:

1. A network-based synchronization system, comprising:

at least one server comprising at least one server processor and a memory storing an electronic tax preparation program operable to prepare an electronic tax return, the at least one server being in communication with a first computing device comprising a first processor through at least one network and in communication with a second computing device comprising a second processor through the at least one network, wherein the first computing device utilizes the electronic tax preparation program, and wherein the second computing device is a mobile communication device including an image acquisition component;

the at least one server processor generating and sending an image acquisition request including a unique session identifier to the second processor, wherein the image acquisition request comprises a message including the unique session identifier and a hyperlink and wherein the second processor is configured to activate the mobile application to start an image acquisition session when the hyperlink is selected; and a mobile application executing on the second computing device and being in communication with the at least one server, wherein the second computing device, the at least one server and the first computing device are cooperatively operable through the at least one network to synchronize the electronic tax preparation program utilized by the first computing device and the mobile application executing on the second computing device based at least in part upon image data acquired by the image acquisition component of the second computing device, wherein the at least one server is configured to receive the image data acquired by the image acquisition component from the second computing device through the at least one network, and the at least one server is configured to transmit the image data received from the second computing device and/or tax information contained in the image data to the first computing device through the at least one network to synchronize the mobile application executing on the second computing device and the electronic tax preparation program utilized by the first computing device including updating the electronic tax preparation program with the tax information;

wherein synchronizing the mobile application and the electronic tax preparation program comprises adjusting a state of the electronic tax preparation program in response to a change in a state of the mobile application or adjusting the state of the mobile application in response to a change in the state of the electronic tax preparation program.

2. The system of claim 1, wherein the at least one server hosts the mobile application.

3. The system of claim 2, wherein the at least one server is configured to transmit the mobile application to the second computing device.

4. The system of claim 1, wherein the first computing device includes a browser that is executable to communicate through the at least one network with the at least one server.

5. The system of claim 4, wherein the first computing device utilizes the electronic tax preparation program through the browser and the at least one network.

6. The system of claim 1, wherein the state of the mobile application relates to image data acquired by the image acquisition component of the second computing device.

7. The system of claim 6, wherein the state of the mobile application relates to optical character recognition of the image data acquired by the image acquisition component of the second computing device.

8. The system of claim 1, wherein the state of the mobile application relates to a location in a series of interview screens.

9. The system of claim 1, wherein the state of the electronic tax preparation program relates to a location in a series of interview screens.

10. The system of claim 1, wherein the first processor is configured to automatically advance a state of the electronic tax preparation program in response to a state of the mobile application being advanced.

11. The system of claim 1, wherein the second processor is configured to automatically advance a state of the mobile application in response to a state of the electronic tax preparation program being advanced.

12. The system of claim 1, wherein the at least one server processor is configured to record respective states of the electronic tax preparation program and the mobile application.

13. The system of claim 1, wherein the at least one server processor is configured to perform optical character recognition on the image data of a tax document in order to obtain the tax information.

14. The system of claim 1, wherein the unique session identifier is included in communications between the first and second computing devices to authenticate the respective communication.

15. The system of claim 1, wherein the first processor is configured to generate and direct display of a summary page including acquired tax information.

16. The system of claim 15, wherein the summary page also includes an identification of a tax document from which the tax information was acquired.

17. The system of claim 15, wherein the first processor is also configured to send the summary page to the second computing device for display thereon.

18. The system of claim 1, wherein the first computing device is a stationary computing device.

19. The system of claim 1, wherein the at least one server processor is configured to determine whether the user received the message.

20. The system of claim 1, wherein the at least one server processor is configured to display information on a user interface of the first computer to inform the user that the tax information obtained from the image data of a tax document is received by the first computer, and wherein the user interface comprises a first user interface object configured to allow the user to stop the image acquisition session and a second user interface object configured to allow the user to start an additional image acquisition session.

* * * * *